United States Patent [19]

Matsumoto et al.

[11] Patent Number: 5,912,931
[45] Date of Patent: Jun. 15, 1999

[54] METHOD FOR MULTICARRIER SIGNAL DETECTION AND PARAMETER ESTIMATION IN MOBILE RADIO COMMUNICATION CHANNELS

[75] Inventors: Tadashi Matsumoto, Walnut Creek; Toshiaki Kuroda, San Ramon, both of Calif.

[73] Assignees: Nextel Communications, Lafayette, Calif.; Nippon Telegraph and Telephone Corporation; Ntt Mobile Communications Network, Inc., both of Tokyo, Japan

[21] Appl. No.: 08/691,110

[22] Filed: Aug. 1, 1996

[51] Int. Cl.$^6$ .................................................. H04L 27/06
[52] U.S. Cl. ............................................ 375/340; 370/526
[58] Field of Search ...................................... 375/229, 231, 375/233, 262, 341, 260, 316, 340, 365, 366, 285, 346; 370/527, 528, 525, 526, 513

[56] References Cited

U.S. PATENT DOCUMENTS

| | | | |
|---|---|---|---|
| 4,365,338 | 12/1982 | McRae et al. | 375/229 |
| 4,599,732 | 7/1986 | LeFever | 375/231 |
| 5,199,047 | 3/1993 | Koch | 375/231 |
| 5,293,401 | 3/1994 | Serfaty | 375/231 |
| 5,297,169 | 3/1994 | Backstrom et al. | 375/231 |
| 5,353,307 | 10/1994 | Lester et al. | 375/232 |
| 5,513,215 | 4/1996 | Marchetto et al. | 375/233 |
| 5,515,378 | 5/1996 | Roy, III et al. | 364/574 |
| 5,648,991 | 7/1997 | Namekata et al. | 375/341 |

OTHER PUBLICATIONS

Cavers, "An Analysis of Pilot Symbol Assisted Modulation for Rayleigh Fading Channels", IEEE Transactions on Vehicular Technology, vol. 40, No. 4, Nov. 1991.

D'Andrea et al., "Symbol–Aided Channel Estimation With Non Selective Rayleigh Fading Channels", IEEE Transactions on Vehicular Technology, vol. 44, No. 1, Feb. 1995.

Moher et al., "TCMP—A Modulation and coding Strategy for Rician Fading Channels", IEEE Journal on Selected Areas in Communications, vol. 7, No. 9, Dec. 1989.

Sunaga et al., "Performance of Multi–Level QAM with Post–Detection Maximal Ratio Combining Space Diversity for Digital Land–Mobile Radio Communications", IEEE Transactions on Vehicular Technology, vol. 42, No. 3, Aug. 1993.

Sampei et al., "Rayleigh Fading Compensation for QAM in Land Mobile Radio Communications," IEEE Transactions on Vehicular Technology, vol. 42, No. 2, May 1993.

Cimini, Jr., "Analysis and Simulation of a Digital Mobile Channel Using Orthogonal Frequency Divisio Multiplexing," IEEE Transactions on Communications, vol. COM–33, No. 7, Jul. 1985.

Jakes, "Microwave Mobile Communications," Electrical Engineering Communications Microwave Theory and Techniques, pp. 44–50.

Proakis, "Modulation and Demodulation for the Additive Gaussian Noise Channel," Digital Communications, 2nd Ed., pp. 278–285.

Primary Examiner—Tesfaldet Bocure
Attorney, Agent, or Firm—Michael A. Glenn

[57] ABSTRACT

A joint signal detection and channel parameter estimation scheme is provided for multiple subcarrier signaling with pilot symbol-assisted modulation schemes. Known symbols located in the subcarriers are used to estimate a pair of parameters associated with the generation process of the fading frequency selectivity common to all of the subcarriers. These known symbol estimates are used to derive parameter pair estimates for unknown symbols located in the subcarriers. This parameter estimation thus effectively extracts information regarding the fading frequency selectivity through the pilot symbols received not only by the subcarrier of interest but by other subcarriers as well. The fading complex envelope with each subcarrier is then derived from the estimates of the parameter pair.

25 Claims, 20 Drawing Sheets

P: Pilot Symbol
I: Information Symbol

METHOD FOR MULTICARRIER SIGNAL DETECTION AND PARAMETER ESTIMATION IN MOBILE RADIO COMMUNICATION CHANNELS

BACKGROUND OF THE INVENTION

1. Technical Field

The invention relates generally to signal detection and channel parameter estimation for multiple subcarrier signals. More particularly, the invention relates to a method for multicarrier signal detection and parameter estimation in mobile radio communication channels.

2. Description of the Prior Art

In multiple subcarrier signaling, the entire bandwidth is divided into several consecutive subbands. The subcarrier frequency located at the center of each subband is modulated by a relatively low speed digital signal. The channel delay spread, $\tau$, is much smaller than the symbol duration, T. T is defined as $T=1/f_s$, where $f_s$ is the symbol rate.

The total symbol rate of the subcarrier system is obtained by multiplying the symbol rate of each subcarrier by the number of subcarriers. Thus, if the symbol rate of each subcarrier is $f_s$ and there are M subcarriers, the total symbol rate is $Mf_s$.

The total symbol rate of a multiple subcarrier system may require an entire bandwidth larger than or equivalent to the channel coherence bandwidth.

However, each subcarrier's bandwidth is small enough to prevent the received signal from being damaged by inter-symbol interference (ISI). Hence, multiple subcarrier signaling is known in the prior art as an effective method for reducing the effects of fading frequency selectivity encountered in mobile communications channels. In such systems, the need for channel equalizers, which might be required for a single carrier signaling scheme with the same (total) symbol rate ($Mf_s$), is eliminated.

FIG. 1 is a graphical representation of a bandwidth 10 divided into multiple subcarriers 12, 14, 16, 18. Frequency-selective fading 20 may cause the degradation of the signal over the entirety of the bandwidth. However, because each individual subcarrier has such a small subband width 21, the fading can be approximated as frequency-flat fading for each of the subcarriers.

Recently, pilot symbol-assisted modulation (PSAM) has been proposed for mobile communication applications. In PSAM, the fading complex envelope is estimated using pilot symbols periodically embedded in the information symbol sequence to be transmitted. FIG. 2 is an example of a symbol sequence frame format 22 according to the prior art. Pilot symbols 24 are periodically embedded in the information symbol 26 sequence. For coherent detection, the complex conjugate of the fading envelope estimate is multiplied by the received signal sample.

It is known to use interpolation techniques for the fading estimation, and apply it to the multilevel quadrature amplitude modulation (QAM) signal transmission over Rayleigh fading channels. See, for example, S. Sampei and T. Sunaga, *Rayleigh Fading Compensation for 16QAM in Land Mobile Radio Communications*, IEEE Trans. VT., vol. VT-42, pp. 137–147. (May 1993); and T. Sunaga and S. Sampei, *Performance of Multi-Level OAM with Post-Detection Maximal Ratio Combining Space Diversity for Digital Land-Mobile Radio Communications*, IEEE Trans. VT., vol. VT-42, pp. 294–301. (August 1993).

PSAM signal detection has also been combined with decoding of trellis codes. See, for example, M. L. Moher and J. H. Lodge, *TCMP—A Modulation and Coding Strategy for Rician Fading Channels*, IEEE JSAC., vol. SAC-7, pp. 1347–1355. (December 1989); and A. N. D'Andrea, A. Diglio and U. Menglai, *Symbol-Aided Channel Estimation with Nonselective Fading Channels*, IEEE Trans. VT, Vol. VT-44, pp. 41–49. (1995).

Recently, the performance limit of the pilot-assisted coherent signal detection has been analyzed where a Wiener filter is used to minimize the variance of the estimation error within the class of linear filters. See, for example, J. K. Cavers, *An Analysis of Pilot Symbol-Assisted Modulation for Rayleigh Fading Channels*, IEEE Trans. VT., Vol. VT-40, pp. 686–693. (1991).

Unlike the case of single carrier signaling, information about the fading complex envelope can be more frequently extracted by locating the pilot symbols at different timings for some of the subcarriers when PSAM is used in subcarrier signaling. FIG. 3 shows an example of a multiple subcarrier PSAM format. The pilot symbols 24 are imbedded at different timings 36, 37 within the information symbol 26 sequence for some of the subcarriers 28, 30, 32, 34.

With PSAM, the pilot symbols of each of the subcarriers are transmitted at a constant frequency. This suggests the use of pilot symbols for more precise fading estimation than the single carrier's case while maintaining a constant, overall spectrum efficiency (=per-subcarrier information symbol rate $/f_s$).

With multiple subcarrier signaling, each of the subcarriers suffers from almost frequency-flat fading because $\tau fs<<1$, where $\tau$ is the channel delay spread. The fading complex envelopes with the M subcarriers are different from each other, but correlate closely. Therefore, this scheme uses neither the frequent pilot symbol reception nor the fading correlation among the subcarriers if fading estimation for coherent detection takes place subcarrier-by-subcarrier.

FIG. 4 is a graph illustrating subcarrier-by-subcarrier detection according to the prior art. Using this method, the power spectrum of the fading envelope 38 at time t is constant for all subcarrier frequencies. The prior art method does not efficiently use fading correlation. Even under frequency-flat fading, fading estimates obtained through signal detections for subcarriers 32 and 34 are not used for subcarrier 28 and 30 signal detections.

One significant drawback of the PSAM signal detection method is that it directly estimates the fading complex envelope. FIG. 5 is a graph illustrating frequency-selective fading according to the prior art. Under these conditions, the power spectrum of the fading envelope 38 at time t differs for varying subcarrier frequencies. As with frequency-flat fading, fading estimates obtained through subcarrier 32 and 34 signal detections cannot be used for subcarrier 28 and 30 signal detections.

If, however, parameters common to all subcarriers and related to the generation process of fading frequency selectivity are estimated, knowledge about fading obtained from other subcarriers can be used for the signal detection of the subcarrier of interest. Thus, as is shown in the graph of FIG. 6, parameter estimates obtained through subcarrier 32 and 24 signal detections can be used for subcarrier 28 and 30 signal detections.

It would be an advantage to provide a joint signal detection and channel parameter estimation scheme for the coherent detection of multiple subcarrier PSAM signals. It would be a further advantage if such a system made effective use of the pilot symbols received by different subcarriers, not necessarily the pilot symbol of interest.

SUMMARY OF THE INTENTION

The invention provides a joint signal detection and channel parameter estimation scheme for multiple subcarrier signaling with pilot symbol-assisted modulation schemes. Known symbols are located at different timings in the frame format of the subcarriers. These known symbols are used to estimate a pair of parameters associated with the generation process of the fading frequency selectivity common to all of the subcarriers. The known symbol estimates are then used to derive parameter pair estimates for information symbols, i.e. unknown symbols, located in the subcarriers. Information regarding the fading frequency selectivity provided by previously received pilot and information symbols from other subcarriers is used to derive the parameter estimates of the subcarrier of interest. The fading complex envelope of each subcarrier of interest is then derived from the estimates of the parameter pair.

DETAILED DESCRIPTION OF THE INVENTION

The invention provides a joint signal detection and channel parameter estimation scheme for multiple subcarrier signaling with pilot symbol-assisted modulation schemes, in which known symbols are located in the subcarriers. Because all of the subcarriers are subject to frequency-selective fading, there are factors associated with the generation of this fading common to all of the subcarriers. Therefore, the known symbols are used to estimate a pair of parameters associated with this common fading generation process. These known symbol estimates are used to derive parameter pair estimates for unknown symbols located in the subcarriers. Such parameter estimation scheme effectively extracts information regarding the fading frequency selectivity not only through the pilot symbols received by the subcarrier of interest, but by other subcarriers as well. The fading complex envelope with each subcarrier is then derived from the estimates of the parameter pair.

The entire bandwidth used in the invention is divided into M consecutive subbands having center frequencies of:

$$f_k = (k-1)\Delta f \tag{1}$$

where $1 \leq k \leq M$ and $\Delta f$ is the channel separation required to prevent adjacent subcarriers from interfering with the subband signals. It is well known in the art that, with appropriate choices of $\Delta f$ and a roll-off filter, the interference from adjacent subcarriers can be ignored.

The k-th subcarrier has a center frequency of $f_k$. Each subcarrier is modulated by a relatively low speed digital signal. In a preferred embodiment of the invention, a multilevel phase-amplitude modulation scheme such as PSK or QAM and the same modulation scheme is used for all the M subcarriers. An orthogonal frequency division multiplexing scheme may also be used in this embodiment of the invention. See, for example, L. J. Cimini, Jr., *Analysis and Simulation of a Digital Mobile Channel Using Orthogonal Frequency Division Multiplexing*, IEEE Trans. COM., Vol. COM-33, pp. 665–675. (1985).

The k-th subcarrier is modulated by the symbol sequence $s_k(n)$ to be transmitted where $n \in (-\infty, +\infty)$ is the symbol timing index. $S_k(n)$ (=I+jQ, where I and Q are the in-phase and quadrature components, respectively) takes one of the signal points defined as a modulation alphabet. It is assumed that the M subcarriers' symbol timings are synchronized with each other.

Figure 1:
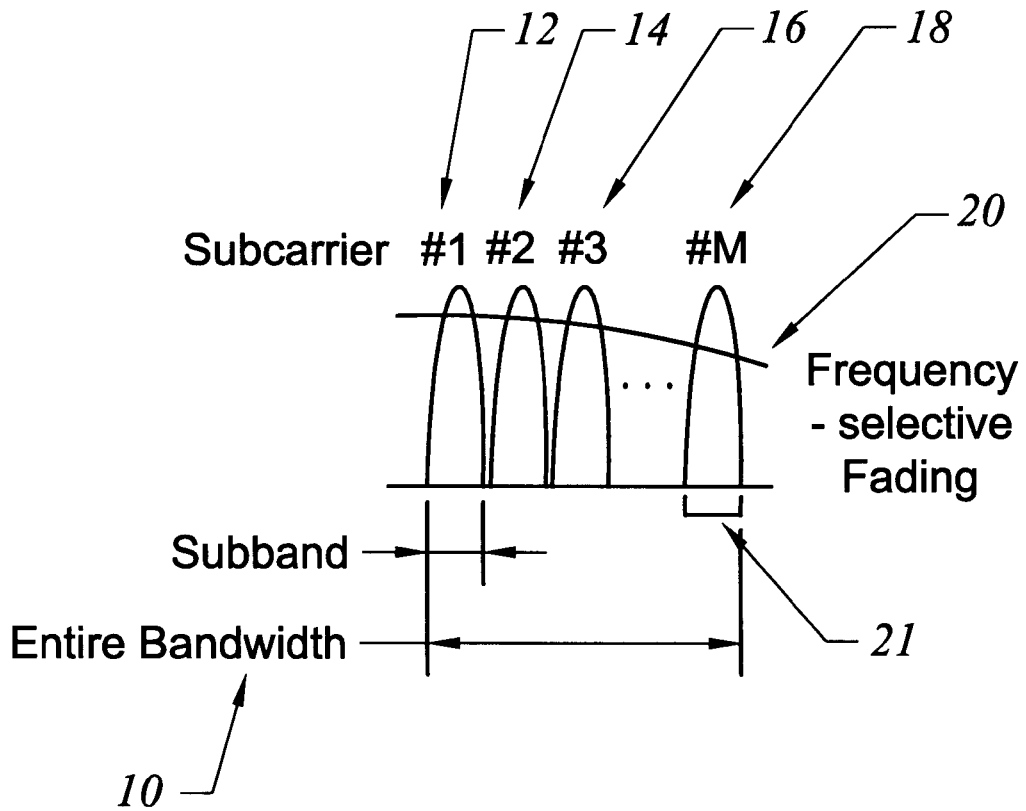
FIG. 1 is a graphical representation of a bandwidth divided into multiple subcarriers according to the prior art.
Figure 2:
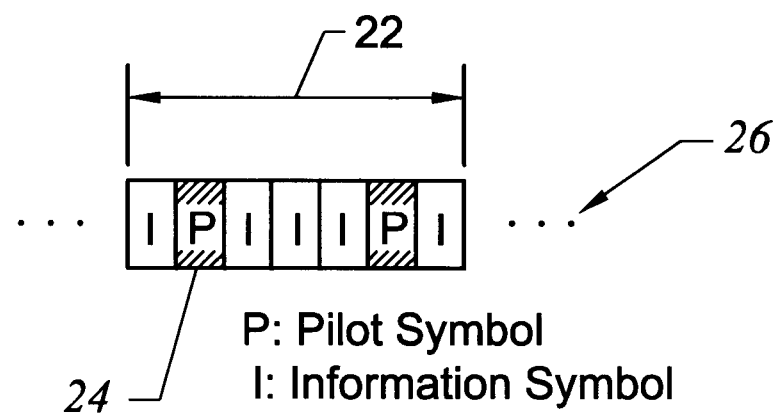
FIG. 2 is an example of a symbol sequence frame format according to the prior art.
Figure 3:
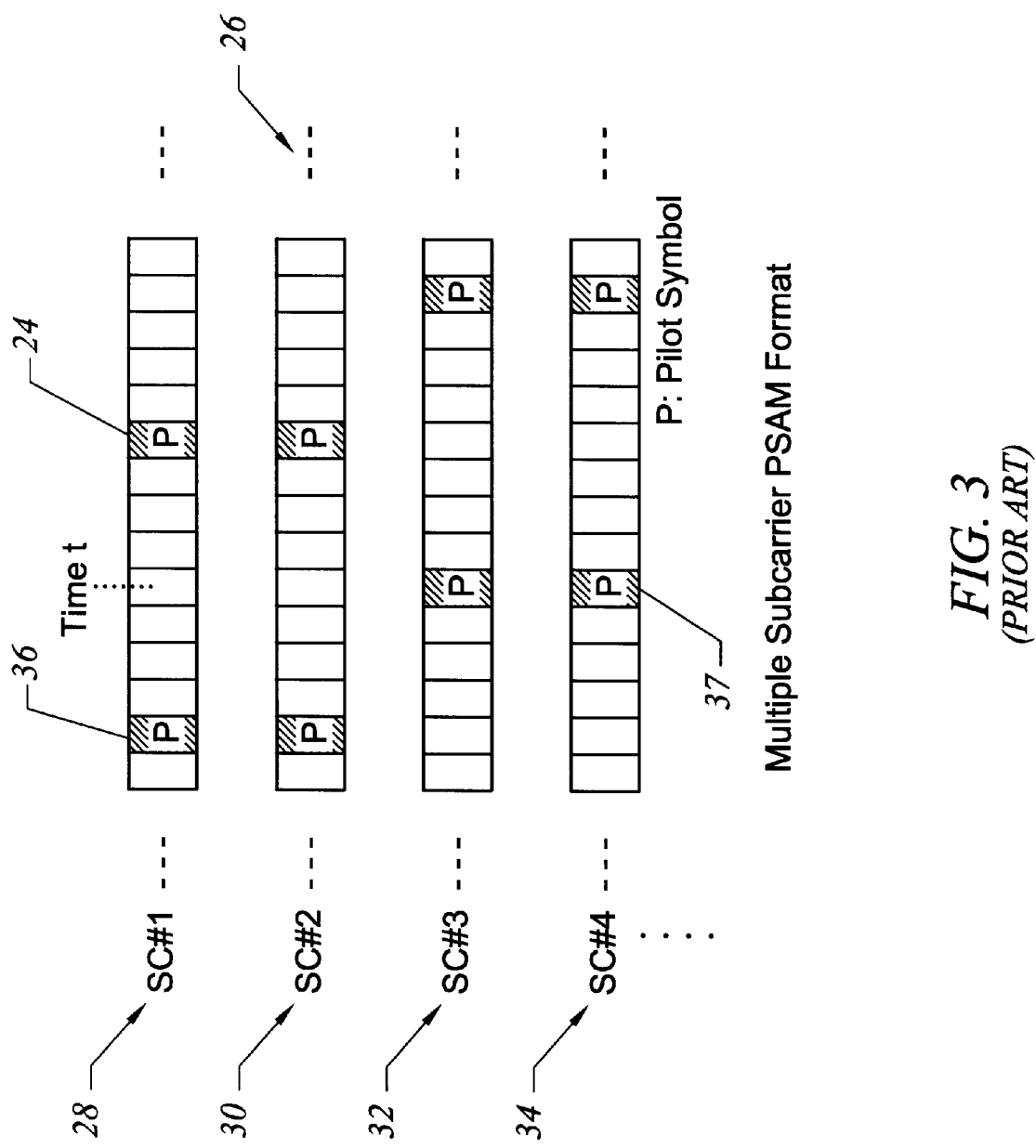
FIG. 3 shows an example of a multiple subcarrier PSAM format according to the prior art.
Figure 4:
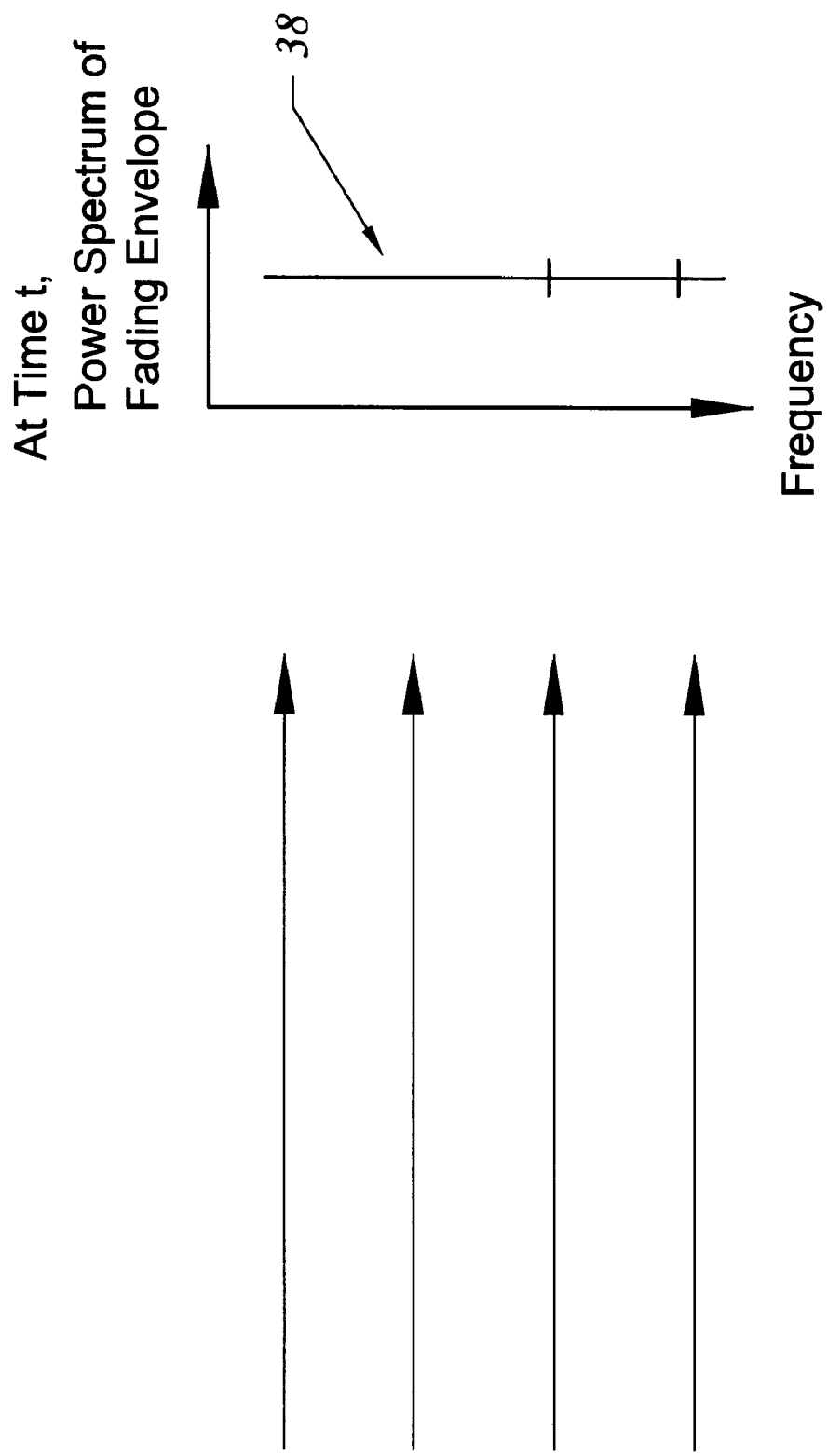
FIG. 4 is a graph illustrating subcarrier-by-subcarrier detection according to the prior art.
Figure 5:
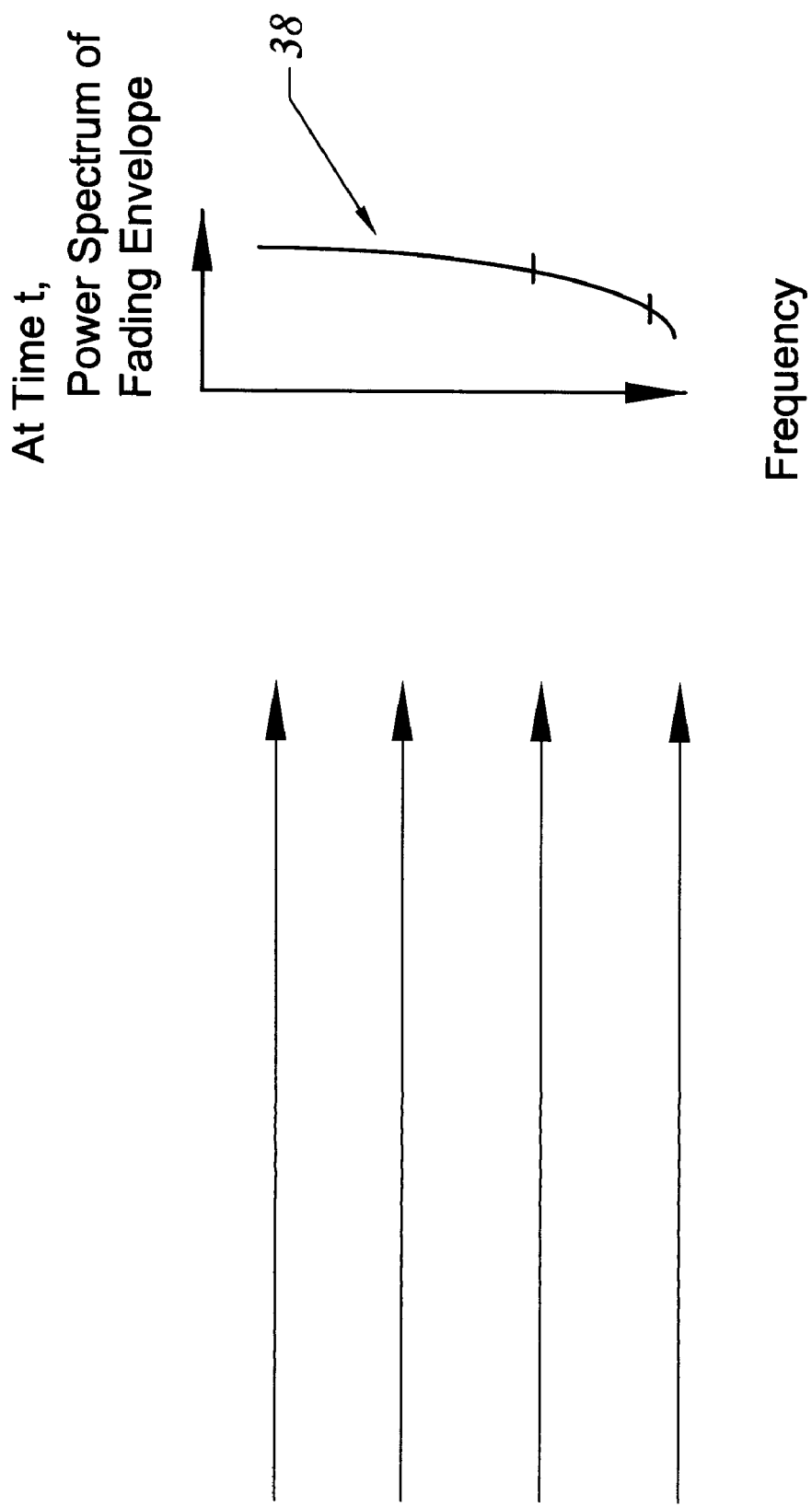
FIG. 5 is a graph illustrating frequency-selective fading according to the prior art.
Figure 6:
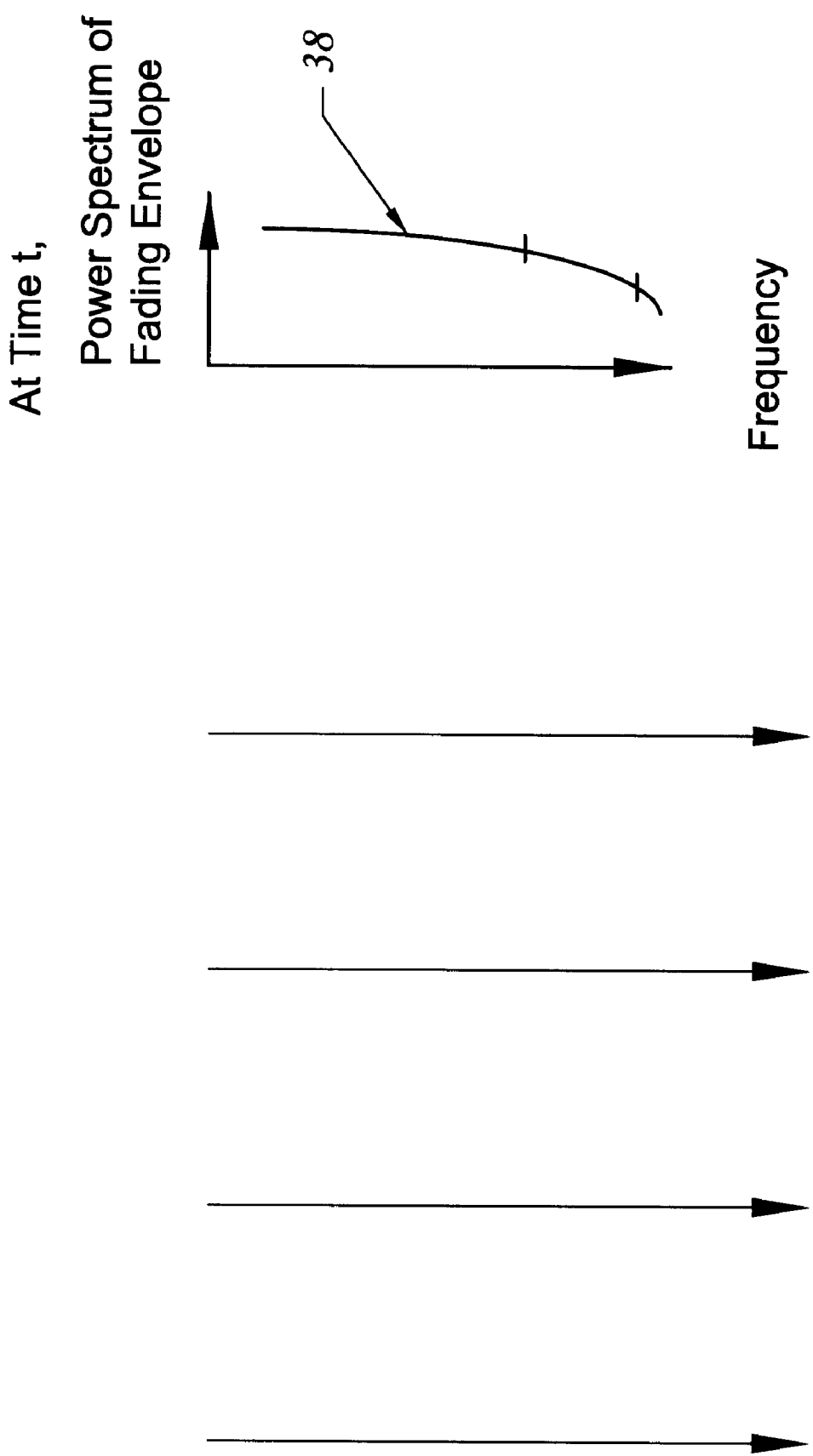
FIG. 6 is a graph illustrating the estimation of parameters common to all subcarriers to detect signal fading.
Figure 7:
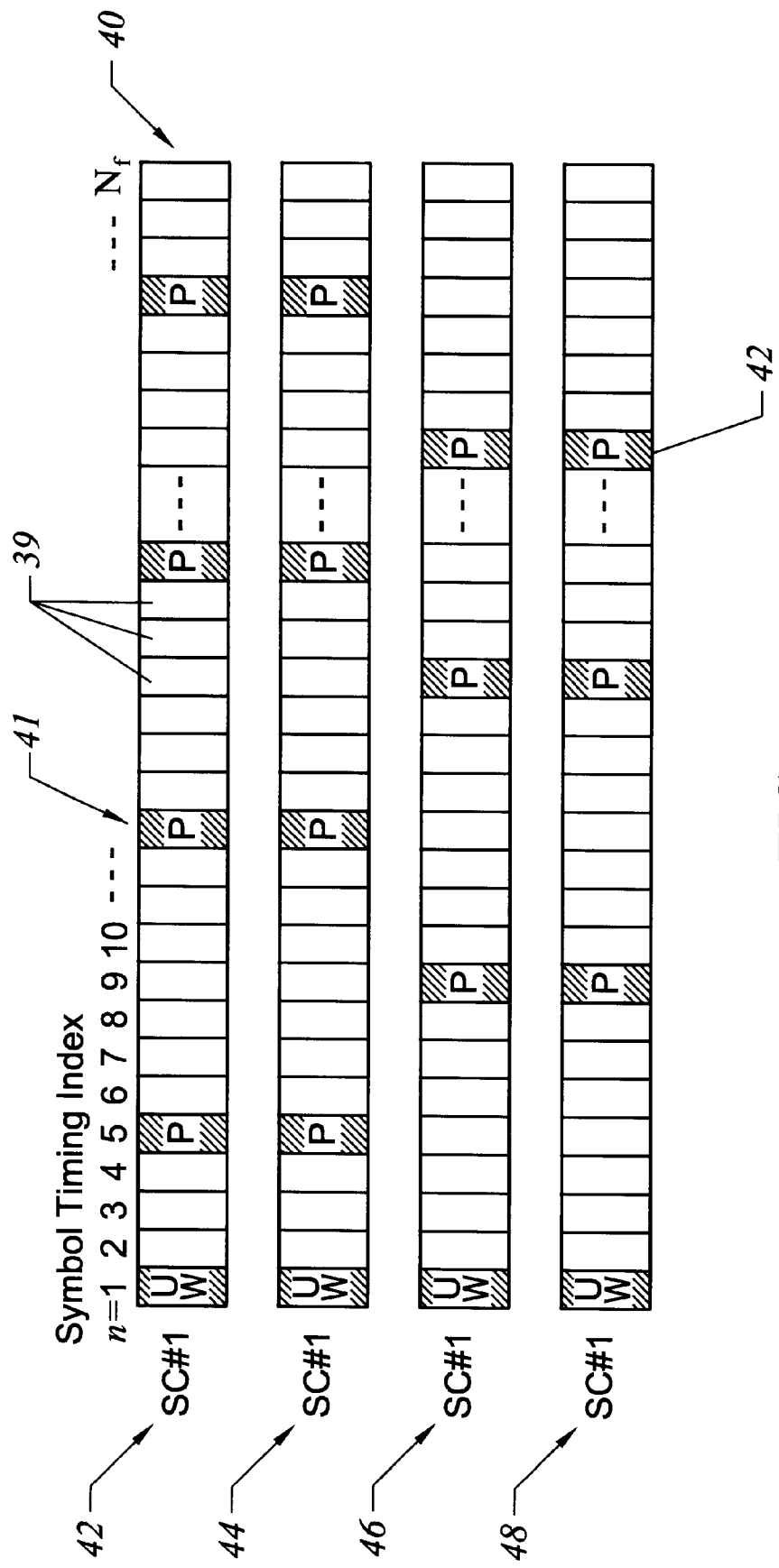
FIG. 7 is a block diagram showing an example of the frame format in accordance with the invention.

The symbol sequence is segmented into frames 39 with length of $N_f$, and with $MN_f$ total symbols in a frame. An example of a presently preferred frame format is shown in FIG. 7. The information symbol sequence 40 for the subcarriers 42, 44, 46, 48 is headed by a unique word sequence having a length of $N_u$ ($MN_u$ symbols in total). The known pilot symbols 41 are periodically embedded in the information symbol sequence. The pilot symbols are located at different timings for some of the subcarriers. This is referred to as an "offset pilot location". The use of such offset pilot locations permits the receivers to more frequently extract information about the fading complex envelope.

Figure 8:
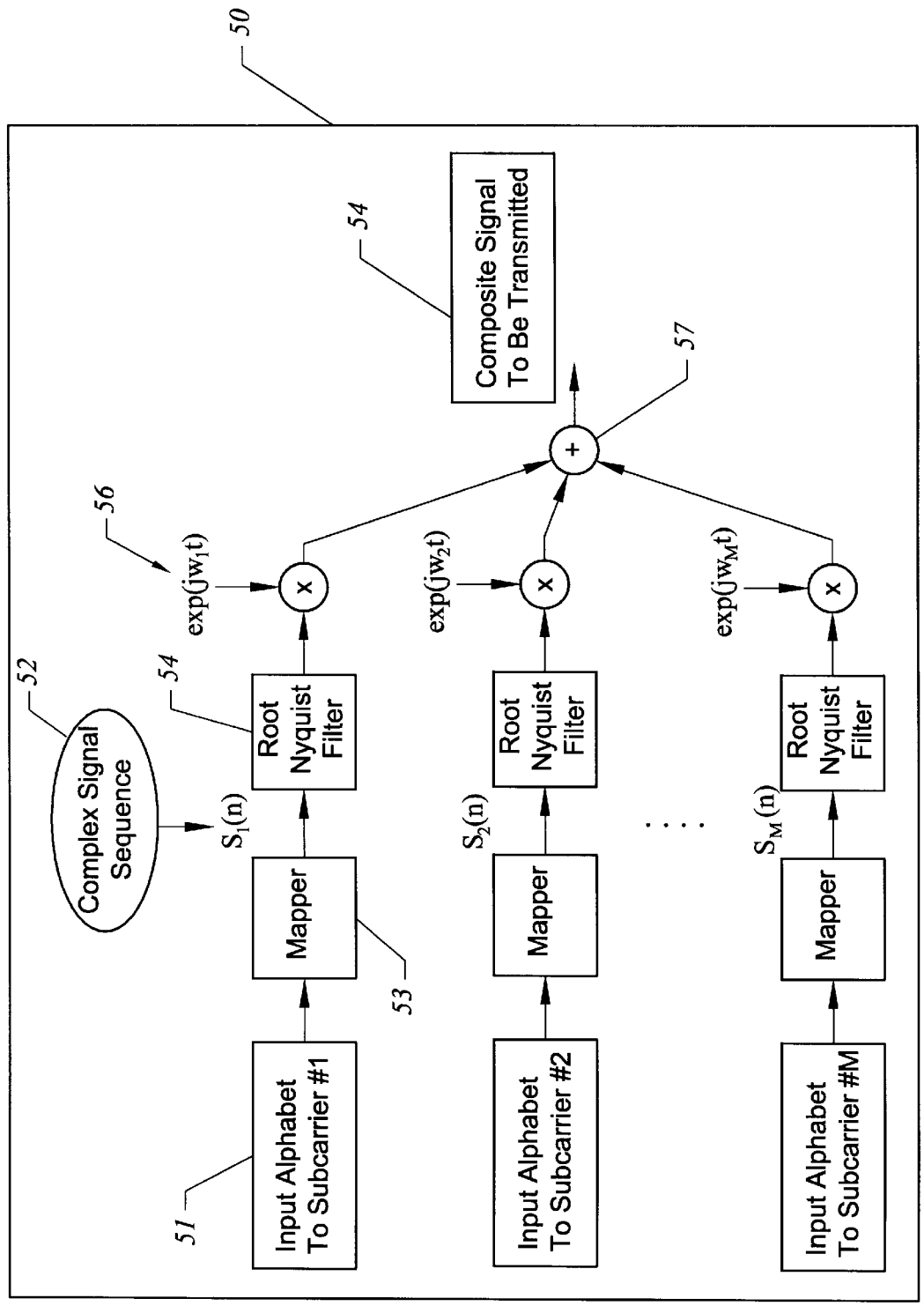
FIG. 8 is a block diagram showing an example of the transmitter in the equivalent complex baseband domain, according to the invention.

FIG. 8 shows a block diagram of the transmitter 50 in the equivalent complex baseband domain. The input alphabet 51 to an individual subcarrier is communicated to a mapper 53. All of the input alphabets together comprise the complex symbol sequence $S_k(n)$ 52. The individual mapped input alphabets are then each filtered by a roll-off filter 54 for spectrum shaping. It is assumed that the overall transfer function of the Nyquist roll-off filter is shared equally by transmitter and receiver. Hence, the modulating signal $Z_{mk}(t)$ of the k-th subcarrier is the output wave form of the root Nyquist roll-off filter. A summer 57 adds the individual signals to form a composite signal for transmission. The composite signal $Z_t(t)$ 58 comprised of the M modulated subcarriers can then be expressed as:

$$Z_t(t) = \sum_{k=1}^{M} Z_{mk}(t)e^{j\omega_k t} \qquad (2)$$

where $\omega k=2\pi f_k$. This complex composite signal is then up-converted and transmitted.

The fading frequency selectivity is due to an N-path propagation scenario. See, for example, W. C. Jakes, *Microwave Mobile Communications*, IEEE Press. (1994).

Figure 9:
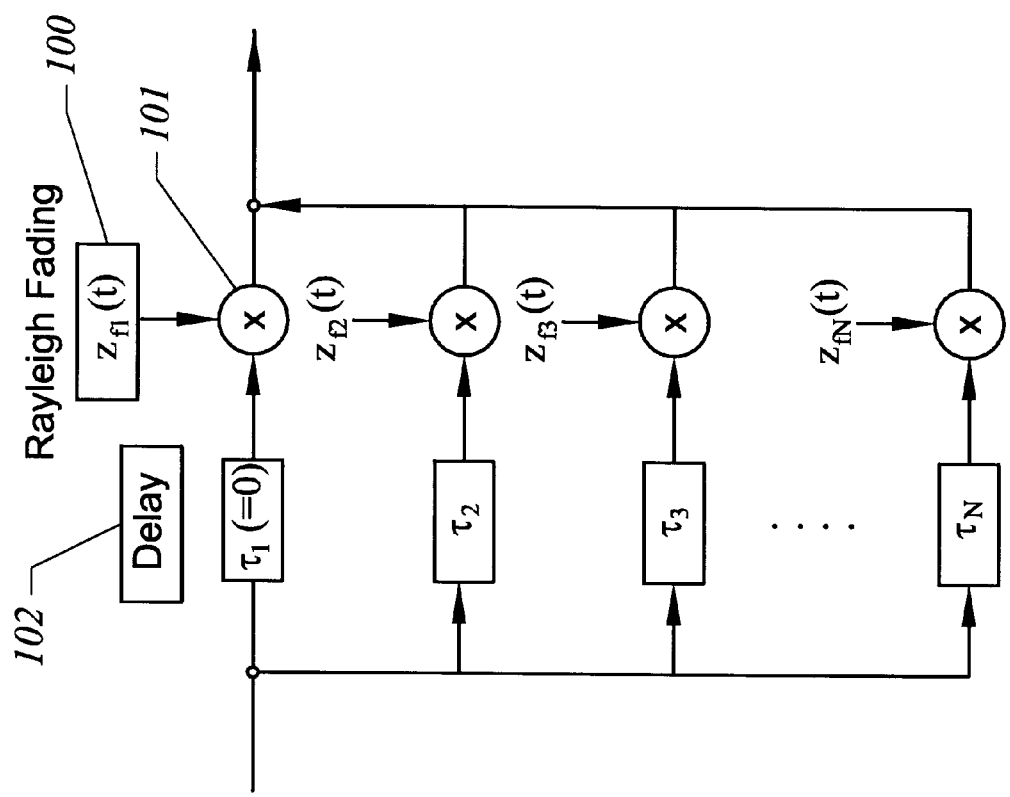
FIG. 9 is a block diagram of the generation process of frequency selective fading in the equivalent complex baseband domain, according to the invention.

FIG. 9 is a block diagram of the generation process of frequency selective fading in the equivalent complex baseband domain, according to the invention. The equivalent baseband transfer function h(t) of the N-path Rayleigh fading channel can be expressed as:

$$h(t) = \sum_{l=1}^{N} Z_{fl}(t)\delta(t - \tau_l), \qquad (3)$$

where $Z_{fl}(t)$ and $\tau_l$ are, respectively, the fading complex envelope 100 and the delay 102 with the l-th propagation path, and $\delta(*)$ is the delta function. Without loss of generality, $\tau_1=0$ is assumed. Because of the multiple subcarrier signaling, the channel delay spread $\tau=Max(\tau_i)$ is assumed to be small enough compared with the symbol duration T $(=1/f_s)$.

Figure 10A:
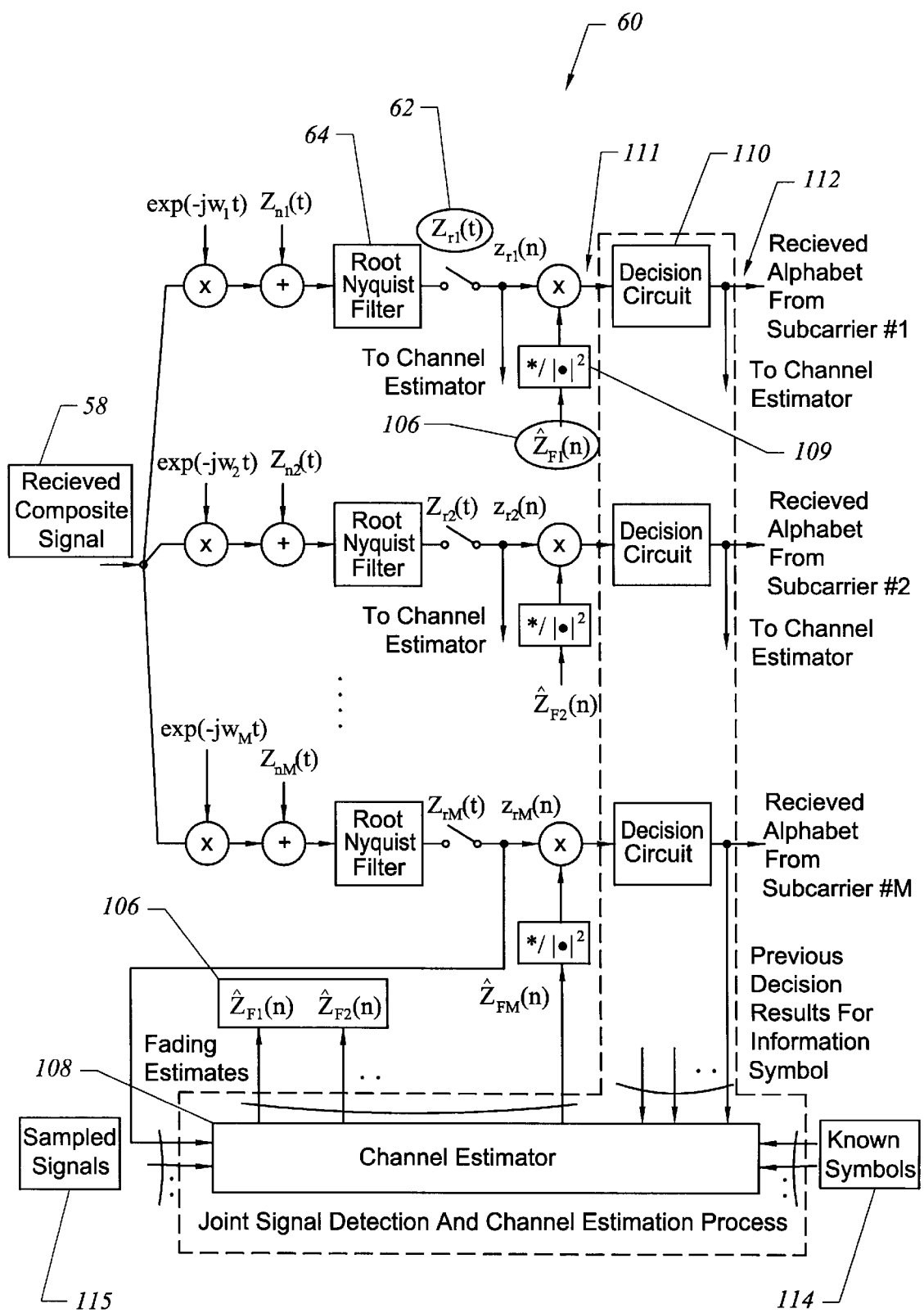
FIG. 10a is a block diagram showing an example of the receiver, according to the invention.
Figure 10B:
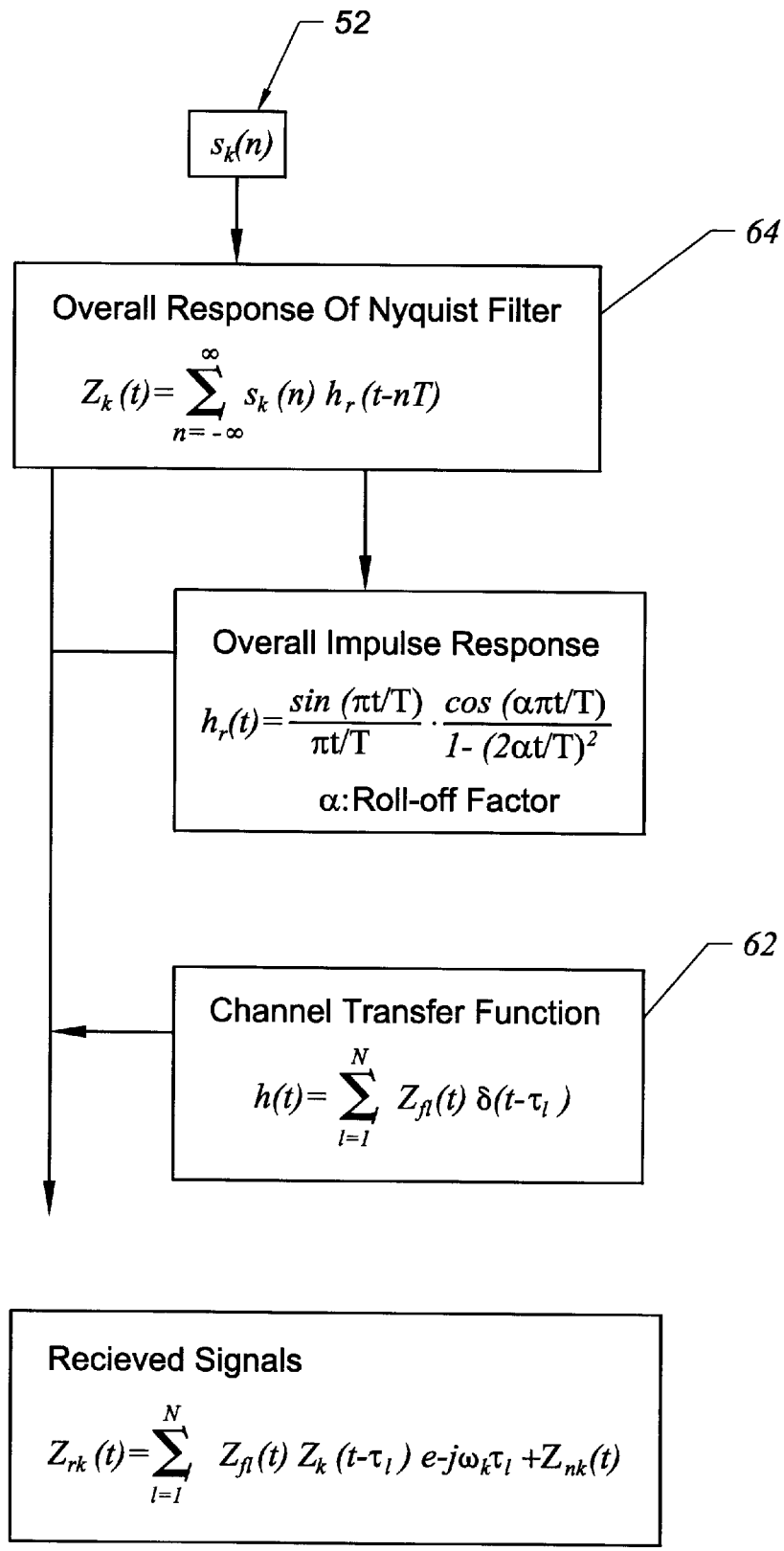
FIG. 10b is a block diagram of the receiver showing the generation of the output of the root Nyquist receiver filter, according to the invention.

FIG. 10a shows a block diagram of the receiver 60 according to the invention. The received composite signal 58, comprising the M modulated subcarriers is separated into its subcarrier components 104 and filtered. For the k-th subcarrier, the output $Z_{rk}(t)$ 62 of the root Nyquist receiver filter 64 becomes:

$$Z_{rk}(t) = \sum_{l=1}^{N} Z_{fl}(t)Z_k(t - \tau_l)e^{-j\omega_k \tau_l} + Z_{nk}(t) \qquad (4)$$

where $Z_k(t)$ is the overall response of the Nyquist roll-off filter to the input complex symbol sequence $s_k(n)$ 52 given by:

$$Z_k(t) = \sum_{n=-\infty}^{\infty} s_k(n)h_r(t - nT) \qquad (5)$$

with:

$$h_r(t) = \frac{\sin(\pi t/T)}{\pi t/T} \cdot \frac{\cos(a\pi t/T)}{1 - (2at/T)^2} \qquad (6)$$

being the overall impulse response of the filter and a being the roll-off factor, and $Z_{nk}(t)$ is the additive white Gaussian noise ("AWGN") component on the k-th subcarrier. These sampled signals are communicated as feedback 115 to the channel estimator 108. FIG. 10b is a block diagram of the receiver further showing the generation of the output $Z_{rk}(t)$ 62 of the root Nyquist receiver filter.

A fading estimate 106, $\hat{Z}_{Fk}(n)$, is then provided for each signal by the channel estimator 108. Means 109 of calculating the gain-controlled complex conjugate provides each of the root Nyquist filter outputs 62 with $\hat{Z}^*_{Fk}(n)/|\hat{Z}_{Fk}(n)|^2$. The resulting signal $Z_{rk}(n)\hat{Z}^*_{Fk}(n)/|\hat{Z}_{Fk}(n)|^2$ 111 is the input to the decision circuit 110. The decision result 112 is communicated back t6 the channel estimator.

Thus, decision results 112 for information symbols and known symbols 114 are available for the channel estimator to use in the joint signal detection and parameter estimation method herein disclosed.

The preferred does not use an equalizer for the ISI cancellation. The receiver filter output is sampled at each symbol timing nT. Ignoring the ISI components in Eq. (5), because of $\tau<<T$, the filter output sample can be approximated as:

$$z_{rk}(n) \approx s_k(n)\sum_{l=1}^{N} z_{fl}(n)h_r(-\tau_l)e^{-j\omega_k \tau_l} + z_{nk}(n) \qquad (7)$$

where $z_{fl}(n)=Z_{fl}(nT)$, $z_{rk}(n)=Z_{rk}(nT)$, and $z_{nk}(n)=Z_{nk}(nT)$. It is found from Eq. (7) that $z_{Fk}(n)$ defined by:

$$z_{Fk}(n) = \sum_{l=1}^{N} z_{fl}(n)h_r(-\tau_l)e^{-j\omega_k \tau_l} \qquad (8)$$

is the (frequency-flat) fading complex envelope from which the k-th subcarrier is suffering. Both $z_{fl}(n)$ and $z_{nk}(n)$ are zero mean complex Gaussian processes with variances of $<|z_{fl}(n)|^2>=\sigma_{fl}^2$, and $<|z_{nk}(n)|^2>=\sigma_{nk}^2$, respectively. If the average signal power $<|sk(n)|^2>=1$, the average received signal-to-noise power ratio (SNR) $\Gamma_k$ for the k-th subcarrier is defined as:

$$\Gamma_k = \sum_{l=1}^{N} \sigma_{fl}^2/\sigma_{nk}^2.$$

Coherent detection requires an estimate:

$\hat{Z}_{Fk}(n)$ of $Z_{Fk}(n)$;

Subsequently, $$\hat{z}^*_{Fk}(n)/|\hat{z}_{Fk}(n)|^2$$

is multiplied by $z_{rk}(n)$, where * denotes the complex conjugate, and a symbol closest to:

$$z_{rk}(n)\hat{z}^*_{Fk}(n)/|\hat{z}_{Fk}(n)|^2$$

is then selected from among the modulation signal points, and output as a decision result.

Hence, one objective of joint signal detection and parameter estimation for the multiple subcarrier PSAM is to provide coherent detectors with accurate estimates $\hat{Z}_{Fk}(n)$'s of $z_{Fk}(n)$'s for each subcarrier using known symbols, such as the unique word and pilot symbols, as well as the previous decision results for the information symbols. Subcarrier-by-subcarrier detection can use the fading estimation schemes for single carrier PSAM, according to the prior art. However, unlike the invention, the prior art fading estimation schemes do not take into account the generation process of the fading frequency selectivity expressed in Eq. (3), which is common to the M subcarriers, nor do they exploit the benefit of the offset pilot location.

Because $\tau \ll T$, higher order terms of $\tau$ in Eq. (8) can be ignored. Thus, $z_{Fk}(n)$ can be approximated as:

$$Z_{Fk}(n) \approx X_1(n) + j\omega_k X_2(n) \quad (9)$$

where:

$$x_1(n) = z_{fl}(n) + \sum_{l=2}^{N} z_{fl}(n)h_r(-\tau_l), \quad (10)$$

and $$x_2(n) = -\sum_{l=2}^{N} \tau_l z_{fl}(n) h_r(-\tau_l). \quad (11)$$

The parameter pair of $x_1(n)$ and $x_2(n)$ is associated with the generation process of the fading frequency selectivity, and is independent of k. If the estimates $\hat{x}_1(n)$ and $\hat{x}_2(n)$ of the parameter pair can be obtained, the estimate $\hat{x}_{Fk}(n)$ of the fading complex envelope $z_{Fk}(n)$ for the k-th subcarrier can also be obtained by using Eq. (9). Hence, the method of the invention estimates the vector $x(n)=[x_1(n)\ x_2(n)]^t$ instead of $z_{Fk}(n)$ itself.

The preferred scheme herein comprises two stages:

Estimates of the parameter pair for known symbols, such as pilot symbols, are first obtained using the recursive least square (RLS) method.

A decision-directed method is then used to obtain estimates for the information symbols.

Figure 11:
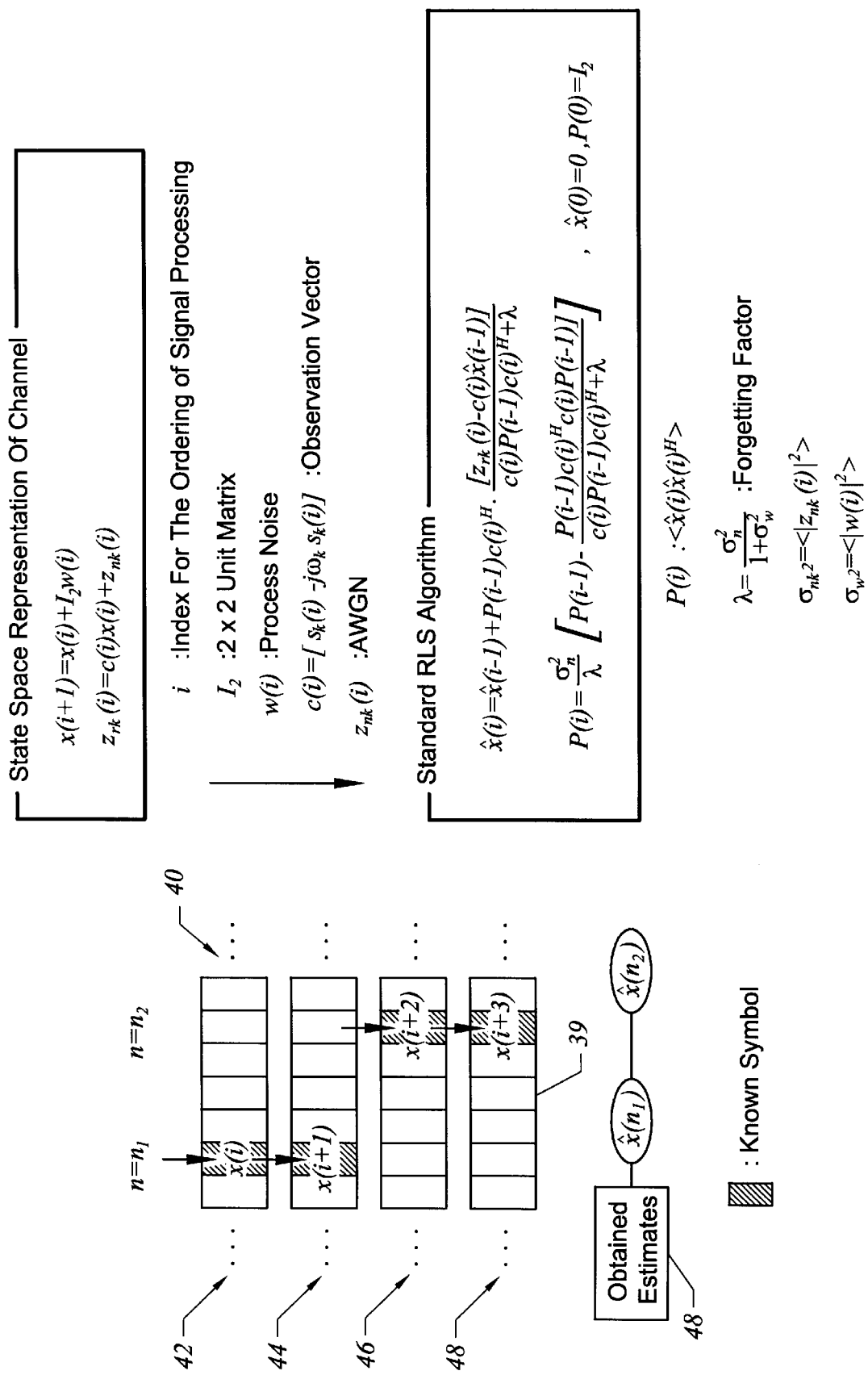
FIG. 11 shows the ordering of signal processing for the frame format of a preferred embodiment of the method of the invention.

FIG. 11 shows the ordering of signal processing for the frame format of FIG. 7. The ordering of signal processing for the known symbols 41 is from small to large n (but not contiguous) corresponding to the pilot symbol timings. In the example illustrated by FIG. 11, the ordering for signal processing is re-indexed by contiguous "i". The state space representation of the channel $$x(i+1) = x(i) + I_2 w(i), \quad (12)$$

$$z_{rk}(i) = c(i)x(i) + z_{nk}(i) \quad (13)$$

is then used for the parameter estimation, where $$c(i) = [s_k(i) - j\omega_k s_k(i)] \quad (14)$$

is the observation vector, w(i) is the process noise, and $I_L$ is the L×L unit matrix. k is the index of the subcarrier on which the known symbols are transmitted.

Because the unique word and pilot symbols are known, $S_k(i)$'s are known. Hence, a standard RLS algorithm can be used for this state space representation to obtain x(i)'s estimate, $\hat{x}(i)$ 120, as:

$$\hat{x}(i) = \hat{x}(i-1) + P(i-1)c(i)^H \cdot \frac{[z_{rk}(i) - c(i)\hat{x}(i-1)]}{c(i)P(i-1)c(i)^H + \lambda}, \quad (15)$$

$$P(i) = \frac{\sigma_{nk}^2}{\lambda}\left[P(i-1) - \frac{P(i-1)c(i)^H c(i)P(i-1)}{c(i)P(i-1)c(i)^H + \lambda}\right] \quad (16)$$

with $\hat{x}(0)=0$ and $P(0)=I_2$, where $P(i)=<[\hat{x}(i)-x(i)][\hat{x}(i)-x(i)]^H>$ with H denoting the transposed complex conjugate of a matrix, and $\lambda$ is a constant given by:

$$\lambda = \frac{\sigma_{nk}^2}{1 + \sigma_w^2} \quad (17)$$

See, for example, Simon Haykin, *Adaptive Filter Theory*, Prentice-Hall. (1986).

The noise variance $\sigma_{nk}^2$ is usually unknown. The accuracy of the scheme herein disclosed is not significantly affected by using the assumption that $\sigma_{nk}^2=1$. Similarly, $\sigma_w^2$ is usually unknown. By assuming that $\sigma_{nk}^2=1$, the forgetting factor $\lambda=1/(1+\sigma_w^2)$ is used to control the speed of the algorithm convergence instead of $\sigma_w^2$, where $0<\lambda\leq 1$.

When the recursion of Eqs. (15) and (16) reaches the last pilot symbol in the frame, there are x(i)'s estimates, $\hat{x}(i)$'s, for every known symbol. $\hat{x}(i)$'s are then used to obtain estimates of the parameter pair for the information symbols that are unknown to the receiver.

Figure 12:
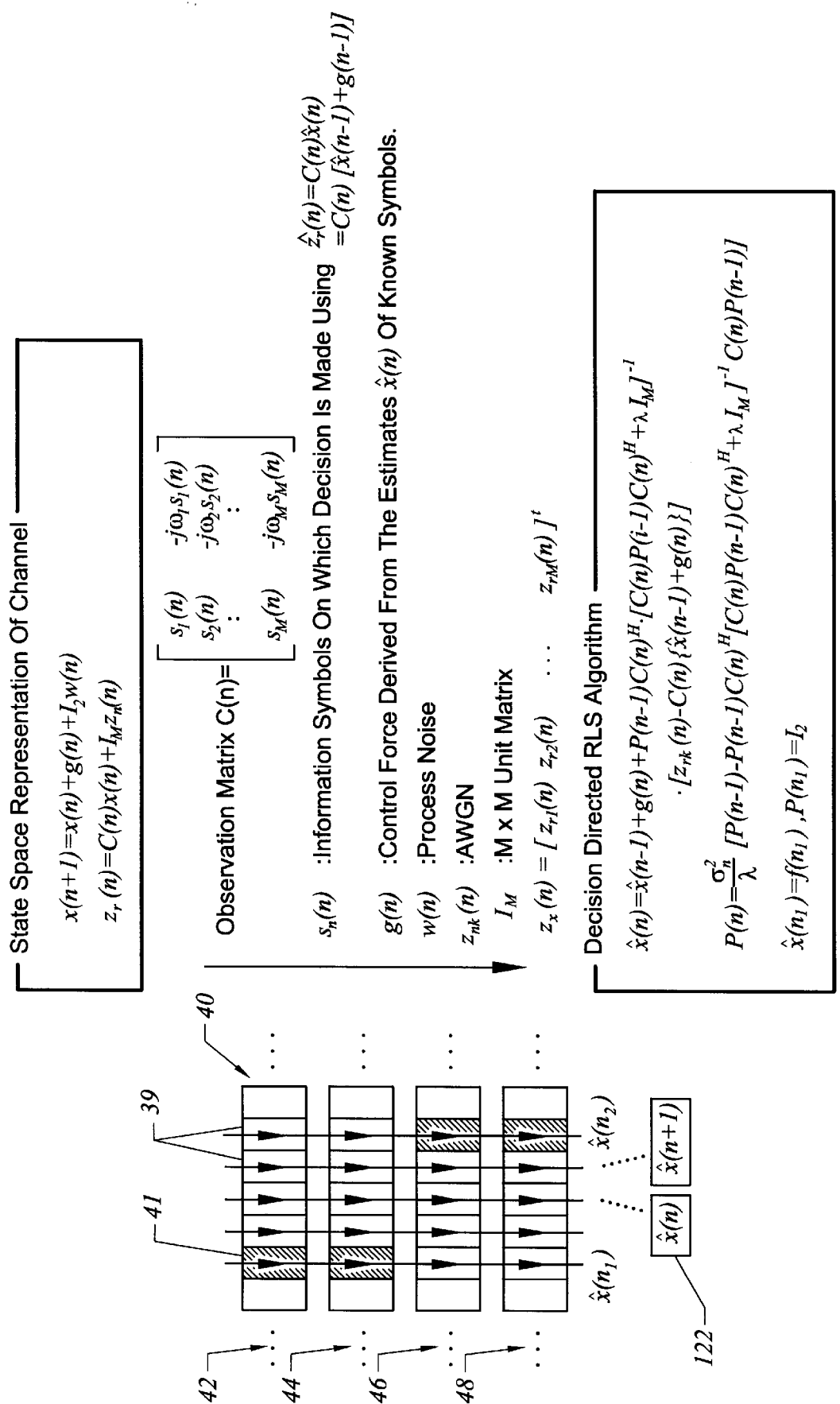
FIG. 12 is an example of the frame format showing the ordering of signal processing for unknown symbols, according to the invention.

Parameter estimation for the information (unknown) symbols, the second stage of the scheme herein disclosed, is decision directed. FIG. 12 shows an example of the frame format in which the ordering of signal processing for unknown symbols 50, according to the invention. In FIG. 12, the symbol timing index n is used for the ordering of signal processing. In the preferred embodiment of the invention, it is assumed that, during a time interval $n_1 \leq n \leq n_2$, the values of the parameter pair $x(n)=[x_1(n)\ x_2(n)]^t$ vary as a function f(n) of n.

Interpolation or curve-fitting schemes using the estimates of several known symbols on both sides as indexed in time, as known in the prior art, may be used to determine f(n). From x(n)=f(n), x(n+1)=x(n)+g(n) where g(n)=f(n+1)−f(n) is the control force that forcibly drives the parameter vector. For example, if an order P polynomial of n is used for f(n) as:

$$f(n) = \sum_{p=0}^{P} a_p n^p,$$

g(n) then becomes:

$$g(n) = \sum_{p=1}^{P} \sum_{q=0}^{p-1} a_p \binom{p}{q} n^q,$$

where $a_{p=(ap1, ap2)^t}$ with $0 \leq p \leq P$.

Hence, for $n_1 \leq n \leq n_2$ the state space representation of the channel becomes $$x(n+1) = x(n) + g(n) + I_2 w(n), \quad (18)$$

$$z_r(n) = C(n)x(n) + I_M z_n(n), \quad (19)$$

where $$z_r(n)=[z_{r1}(n)z_{r2}(n) \ldots z_{rM}(n)]^t, \quad (20)$$

and $$C(n) = \begin{bmatrix} s_1(n) & -j\omega_1 s_1(n) \\ s_2(n) & -j\omega_2 s_2(n) \\ M & M \\ s_M(n) & -j\omega_M s_M(n) \end{bmatrix} \quad (21)$$

For this state space representation with g(n) as a control force, the following recursive algorithm is provided:

$$\hat{x}(n)=\hat{x}(n-1)+g(n-1)+P(n-1)C(n)^H \cdot [C$$

$$(n)P(n-1)C(n)^H+\lambda I_M]^{-1} \cdot [z_{rk}(n)-C(n)\{\hat{x}(n-1)+g(n-1)\}] \quad (22)$$

$$P(n) = \frac{\sigma_{nk}^2}{\lambda}\Big[P(n-1) - $$

$$P(n-1)C(n)^H [C(n)P(n-1)C(n)^H + \lambda I_M]^{-1} C(n)P(n-1)\Big] \quad (23)$$

with $\hat{x}(n_1)=f(n_1)$ and $P(n_1)=I_2$.

Unlike the estimation process for known symbols, the information symbols $s_k(n)$'s are unknown when the recursion reaches the index n. Hence, decisions on the unknown symbols on the M subcarriers have to be made prior to the recursion of Eqs. (22) and (23). To do this, $\hat{x}(n)$ 122 is estimated from $\hat{x}(n-1)$ as:

$$\hat{x}(n)=\hat{x}(n-1)+g(n-1). \quad (24)$$

The estimate of the fading complex envelope for the k-th subcarrier, required for the coherent detection at symbol timing n, can then be obtained from Eq. (9). Decisions on $s_k(n)$'s can then be made. The process described above is repeated for other intervals $(n_1,n_2)$'s for the detection of other information symbols between the known unique word and/or pilot symbols.

If $n_2-n_1$ is relatively small, for $n \in (n_1,n_2)$, the parameter vector x(n) is assumed to vary as a linear function of n as $x(n)=f(n)=a_1n+a_0$, where $a_1=(a_{11},a_{12})^t$ and $a_0=(a_{01},a_{02})^t$. In this case, the control force $g(n)=f(n+1)-f(n)=a_1$. If $n_1$ and $n_2$ are the symbol timings for the known symbols in this embodiment of the invention, $a_1$ is estimated to be:

$$a_1 = \frac{\hat{x}(n_2) - \hat{x}(n_1)}{n_2 - n_1} \quad (25)$$

for $n_1 \leq n \leq n_2$.

Figure 13:
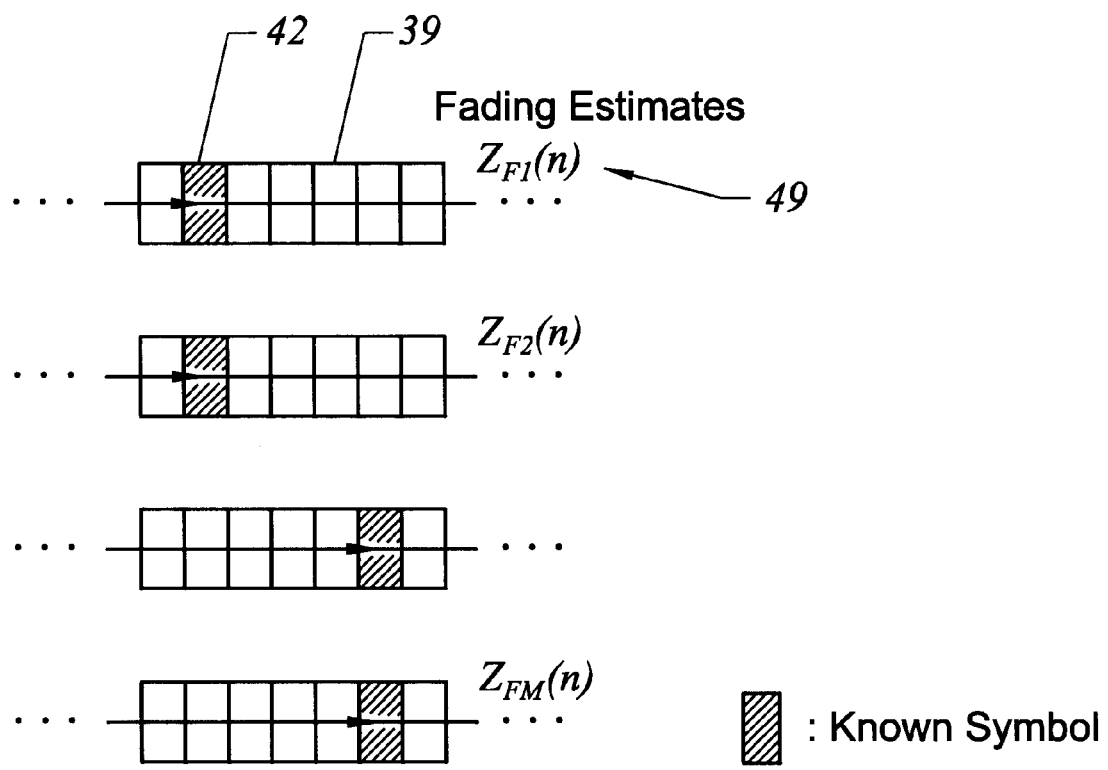
FIG. 13 is a diagram showing the ordering of signal processing for subcarrier-by-subcarrier estimation, according to the prior art.

Subcarrier-by-subcarrier estimation, as has been previously described, directly estimates the fading complex envelope $Z_{Fk}(n)$ itself. As shown in FIG. 13, this process takes place for each subcarrier independently of other carriers. The estimates $\hat{Z}_{Fk}(n)$'s of $Z_{Fk}(n)$'s for the (unknown) information symbols can be obtained in the same way as the estimates $\hat{x}(n)$'s of the parameter vector x(n)'s. The two-stage estimation process described above can be applied to state space representation of $z_{Fk}(n)$'s for the known and the information symbols.

Computer simulations have been conducted for the performance evaluations herein disclosed. 4-PSAM/16QAM is used as a modulation scheme for the simulations. Thus, there are four subcarriers having a PSAM format. Symbol error rate (SER) performances that are obtained using the invention are compared with the prior art subcarrier-by-subcarrier estimation and detection schemes.

The example computer simulations use the frame format described in FIG. 7. The frame is sixty symbols long ($N_f$=60) and the unique word is one symbol long ($N_u$=1). Because there are four subcarriers, a single frame is comprised of two hundred and forty 16QAM symbols. The pilot symbols are transmitted every eight symbols per subcarrier but their positions are different among the subcarriers. At the receiver, the pilot symbols are received every four symbol timings.

The roll-off factor of the Nyquist filter in the computer simulations is estimated at $\alpha$=0.5. The channel separation between the subcarriers $\Delta f/f_s$, normalized by the per-subcarrier symbol rate $f_s$, is 1.125. Therefore, with $\alpha$=0.5 the interference components from the adjacent subcarriers can be ignored. An equal power two-path propagation model (N=2) is assumed. It is also assumed that, for all the M subcarriers, $\Gamma_k=\Gamma$. $f(n)=a_1n+a_0$ was used as the control force, where a1 was determined using Eq. (25).

Figure 14:
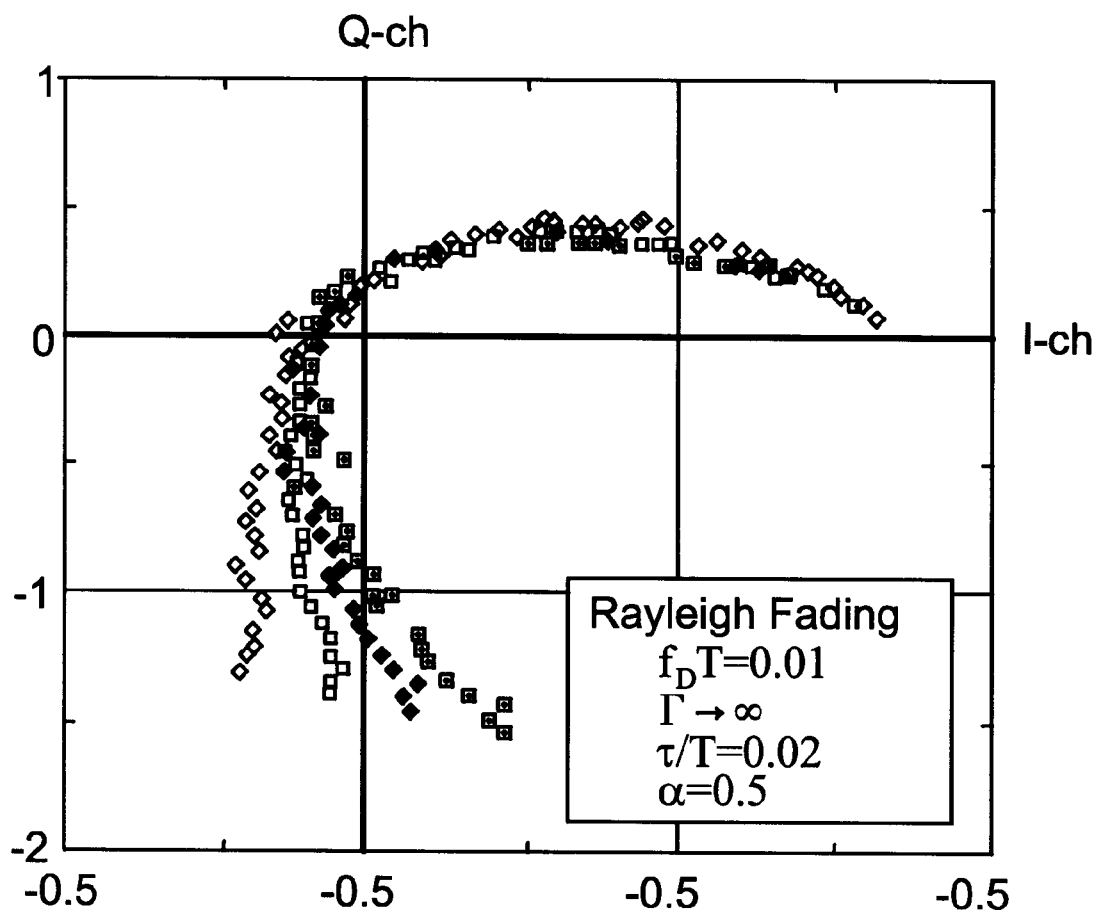
FIG. 14 is a graph showing an example of the behavior of the estimated fading complex envelopes for four subcarriers, according to the invention.

The behavior of the estimated fading complex envelopes 49 $\hat{Z}_{Fk}(n)$'s for the four exemplary subcarriers is demonstrated in the graph of FIG. 14 for the delay spread $\tau/T$ and the maximum Doppler frequency $f_DT$, both normalized by symbol duration T, of, respectively, 0.02 and 0.01, and the per-carrier average received SNR of $\Gamma \to \infty$.

Figure 15:
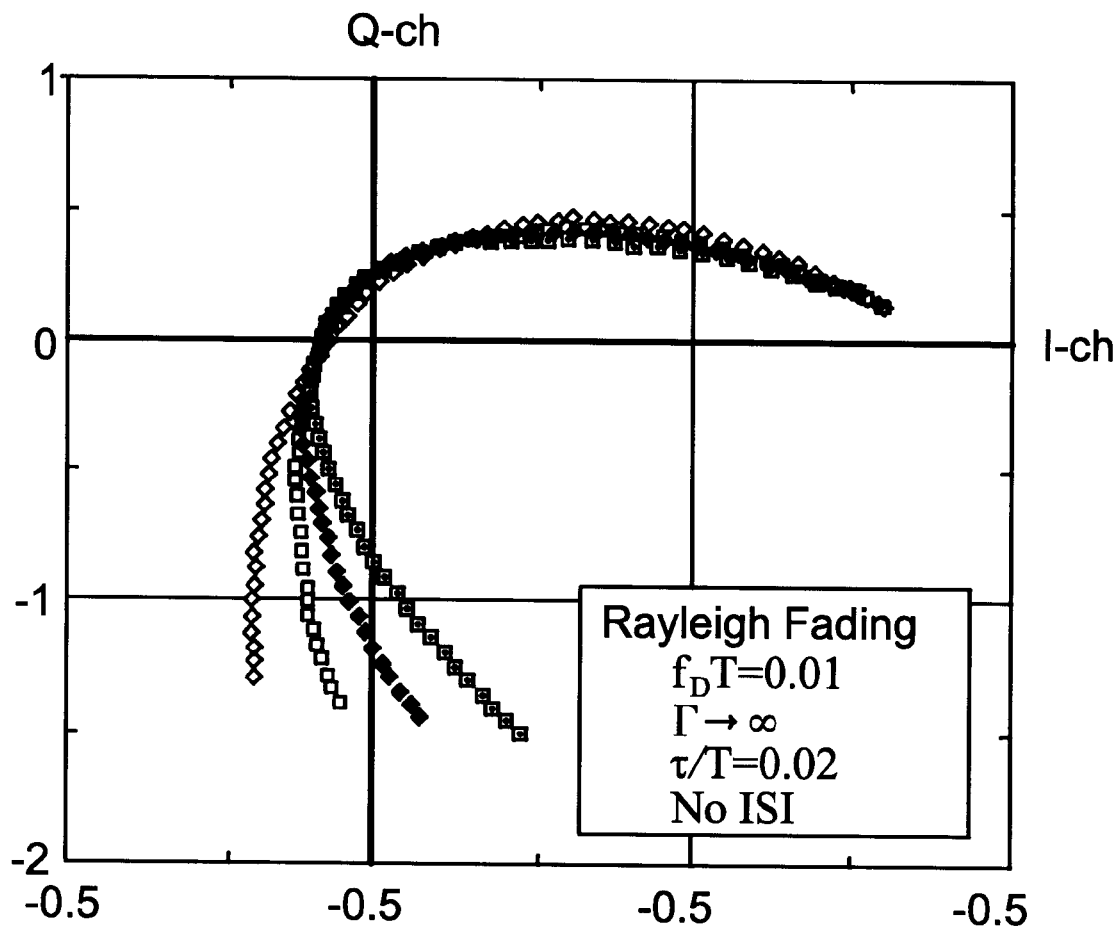
FIG. 15 is a graph showing an example of the behavior of the corresponding actual fading complex envelopes for four subcarriers, according to the invention.

FIG. 15 is a graph showing the behavior of their corresponding actual fading complex envelopes $z_{Fk}(n)$'s. It is found that the estimated fading complex envelopes $\hat{Z}_{Fk}(n)$'s track the actual fading complex envelopes $z_{Fk}(n)$'s relatively well. However, they do fluctuate around the trajectory of $z_{Fk}(n)$'s. This is mainly because the ISI components from the adjacent symbols ignored during parameter estimation (see Eq. (7)) perturb the algorithm convergence.

Figure 16:
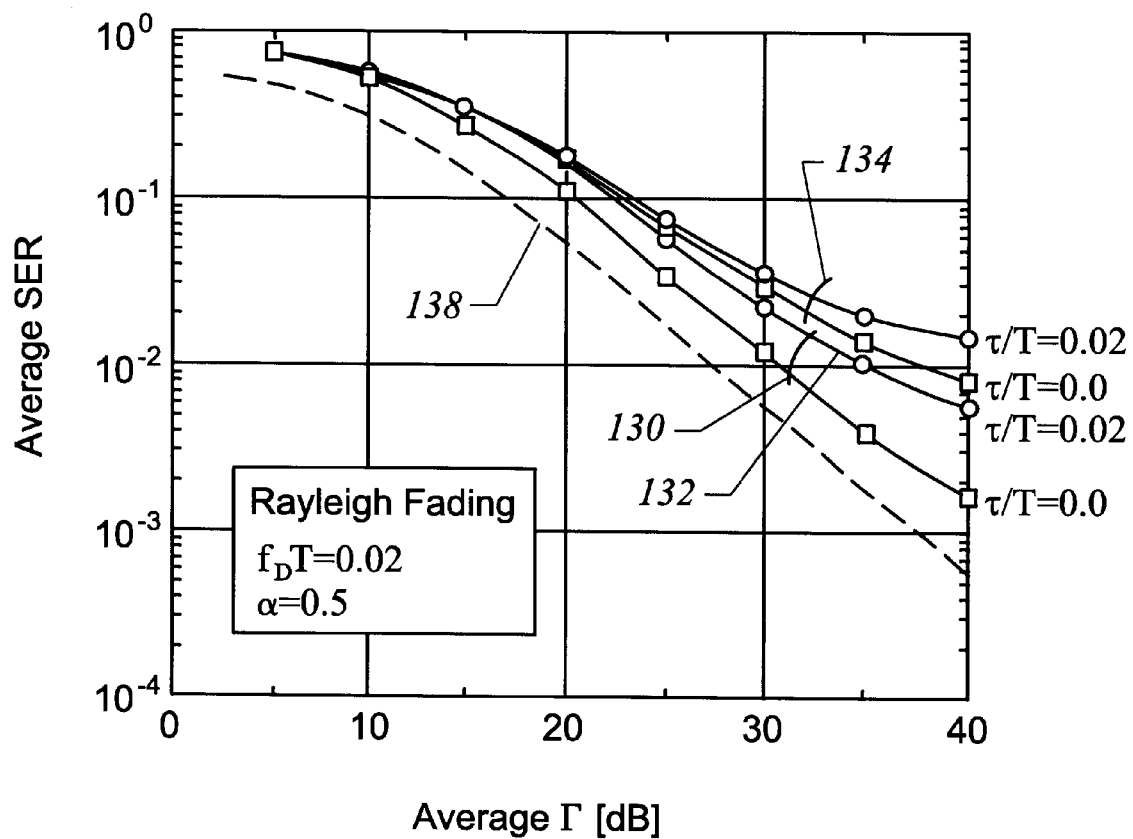
FIG. 16 is a graph showing an example of the SER performance of the invention, and an example of the subcarrier-by-subcarrier detection scheme versus per-carrier average received SNR for four subcarriers, according to the invention.

FIG. 16 is a graph showing the SER performances obtained using the invention and using the subcarrier-by-subearrier detection scheme versus percarrier average received SNR $\Gamma$, with $f_DT$ and $\tau/T$ as parameters. Both parameters are normalized by symbol duration T. For both cases of $\tau/T$=0 and $\tau/T$=0.02, the invention 130, 132 achieves better performance than the subcarrier-by-subcarrier scheme of the prior art 134, 136. When $\tau/T$=0, the theoretical average SER for the 16QAM coherent detection can be calculated from $$\text{AverageSER} = \int_0^\infty \frac{3}{2} \text{erfc}\left(\sqrt{\frac{\gamma}{10}}\right) \cdot \left[1 - \frac{3}{8}\text{erfc}\left(\sqrt{\frac{\gamma}{10}}\right)\right] \cdot p(\gamma) d\gamma, \quad (26)$$

where $p(\gamma)$ is the probability density function pdf of the received instantaneous SNR $\gamma$. See, for example, J. G. Proakis, *Digital Communications*, McGraw-Hill. (1983). Under Rayleigh fading, $p(\gamma)=(1/\Gamma)\exp(-\gamma/\Gamma)$.

The theoretical average SER 138 is also plotted in FIG. 16. It is found that with $\tau/T$=0, the average SER of the invention is about 3 dB different than the theoretical SER. In alternate embodiments of the invention, different control forces f(n) than that given by Eq. (25) are applied. Thus, the appropriate control force are applied in the alternate embodiments of the invention to reduce the difference between the average SER according to an example of the invention and the theoretical average SER, thereby improving performance.

Figure 17:
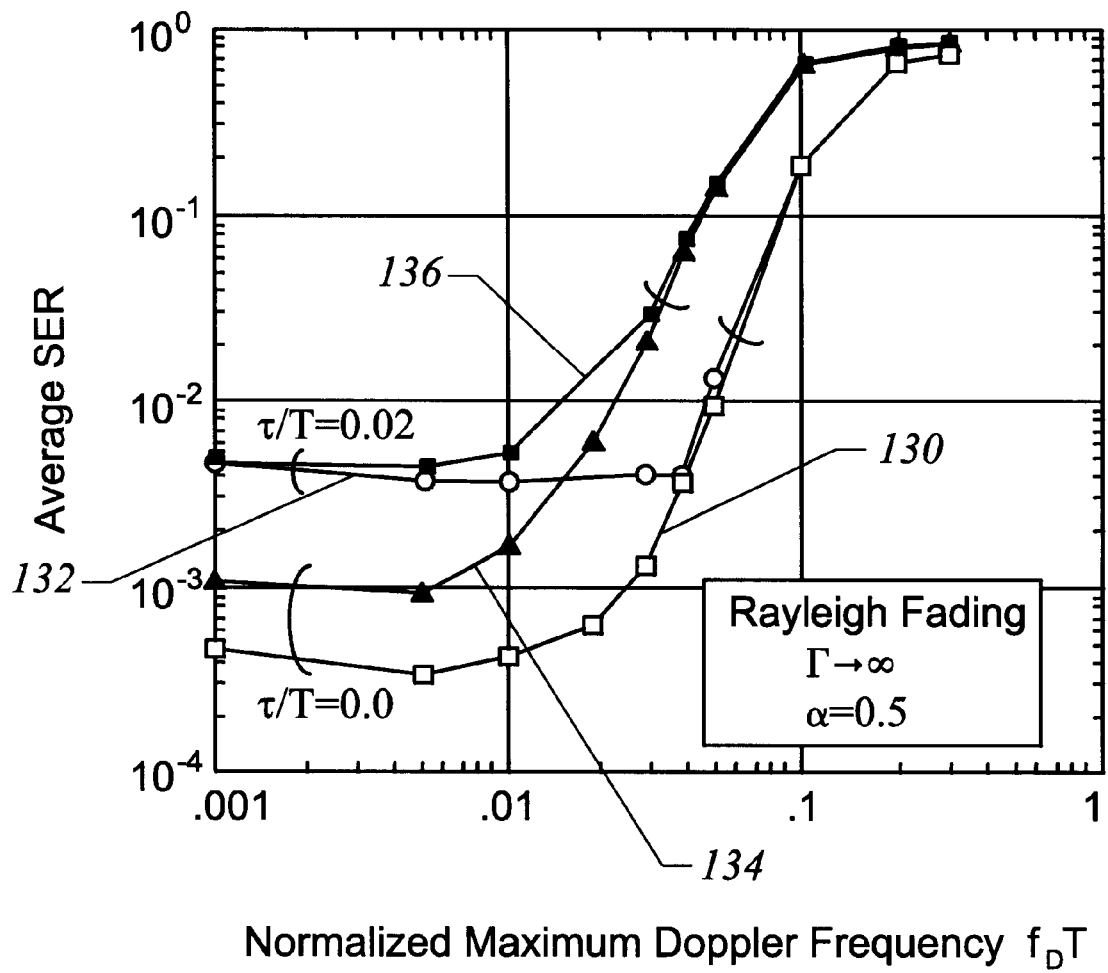
FIG. 17 is a graph showing an example of the SER performances versus $f_D T$ according to the invention.

FIG. 17 shows the SER performances for $\Gamma \to \infty$ versus $f_DT$ with $\tau/T$ as a parameter. It is found that with $\tau/T$=0.02, the average SER 132 of this example of the invention is almost identical to that 136 of the subcarrier-by-subcarrier scheme when the normalized maximum Doppler frequency $f_DT$ is relatively small. This is because in a small value range of $f_DT$, the performances are dominated by the ISI components ignored in both the invention and the subcarrier-by-subcarrier schemes.

With $\tau/T=0$, the SER performances 130, 134 of both this example of the invention and subcarrier-by-subcarrier schemes also plateau as $f_DT$ becomes smaller, even though there is no ISI. This is because the covariance matrix P(i) or P(n) in the Kalman algorithm tends to be singular when $f_DT \to 0$ and $\Gamma \to \infty$. When $f_DT$ becomes large, the invention achieves better SER performance than the subcarrier-by-subcarrier scheme for both $\tau/T=0$ and $\tau/T=0.02$. This clearly indicates how effective it is to use the knowledge about the channel obtained by other subcarriers' signal detection processes.

Figure 18:
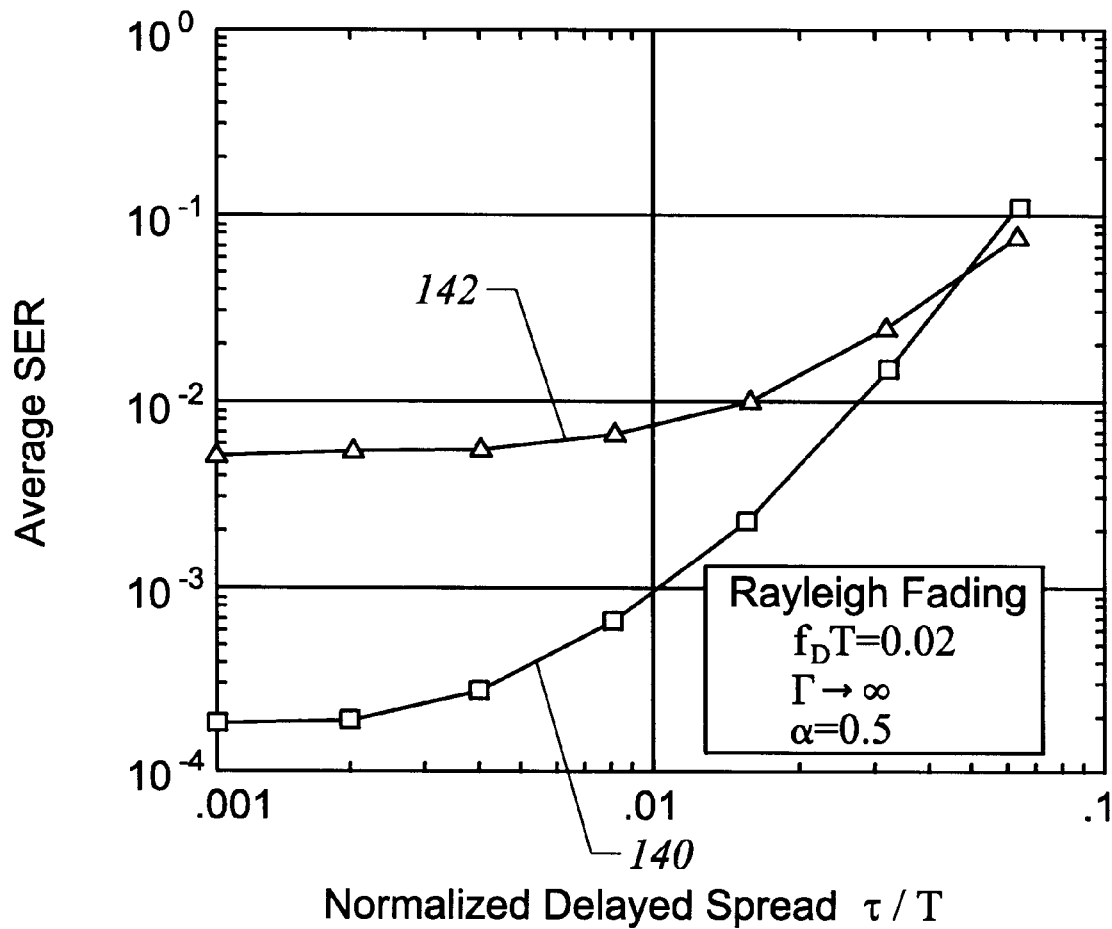
FIG. 18 shows an example of the SER performances versus $\tau/T$, according to the invention.

FIG. 18 shows the SER performances versus $\tau/T$ for $\Gamma \to \infty$ and $f_DT=0.02$. The SER performance with an example of the invention 140 is worse than the performance with the subcarrier-by-subcarrier scheme 142 when $\tau/T>0.05$. A system design that allows $\tau/T>0.05$ does not take full advantage of multiple subcarrier signaling. When $\tau/T \leq 0.05$, the invention achieves smaller SER than the subcarrier-by-subcarrier scheme.

Figure 19:
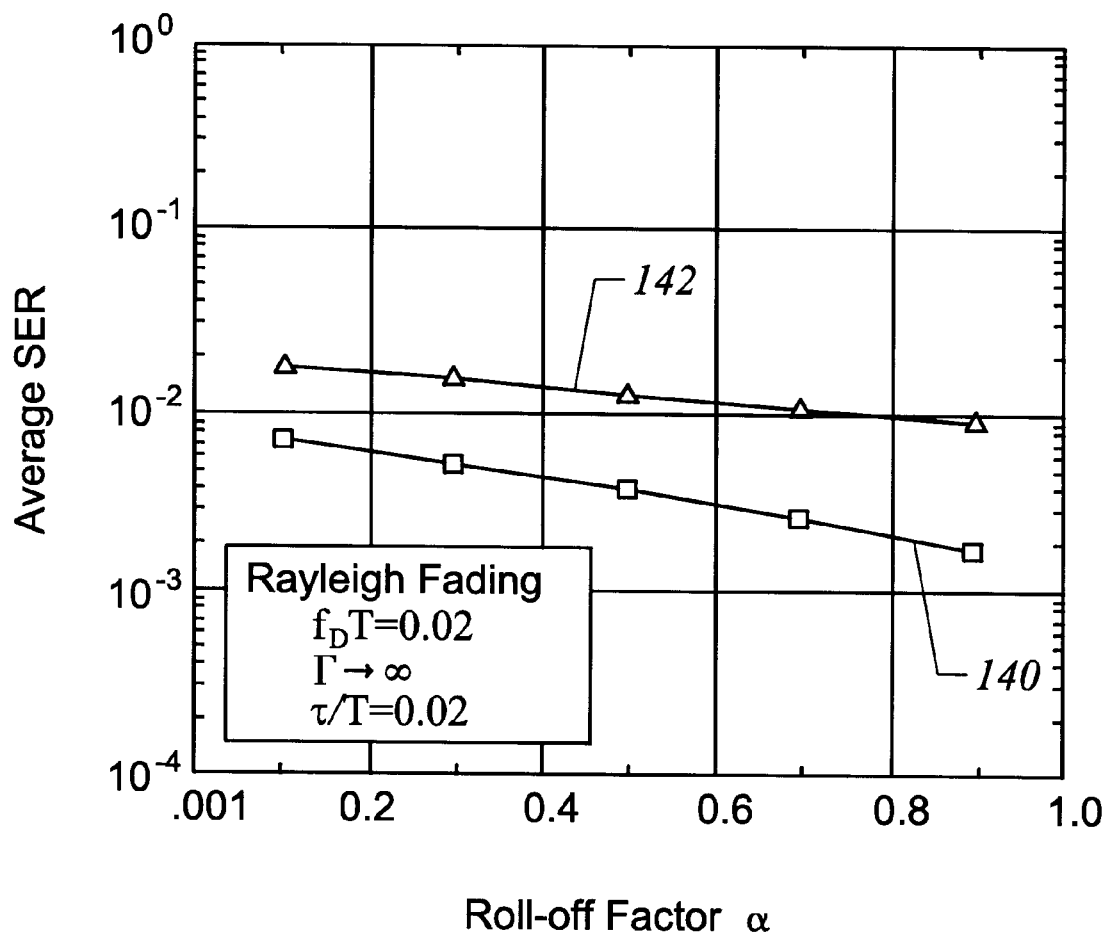
FIG. 19 shows an example of the SER performance versus $\alpha$, according to the invention.

In Eq. (7) the ISI components from the adjacent symbols, which are due to the fading frequency selectivity, were ignored because $\tau<<T$. In fact, the ISI places SER floors in the performance curves. The ISI effects depend on the roll-off factor $\alpha$. FIG. 19 shows the SER performance versus $\alpha$ for $\Gamma \to \infty$, with $\tau/T=0.02$ and $f_DT=0.02$. It is found that better performance can be achieved by larger $\alpha$ values. The SER is less sensitive to the $\alpha$ value with the subcarrier-by-subcarrier scheme than with the invention.

Figure 20:
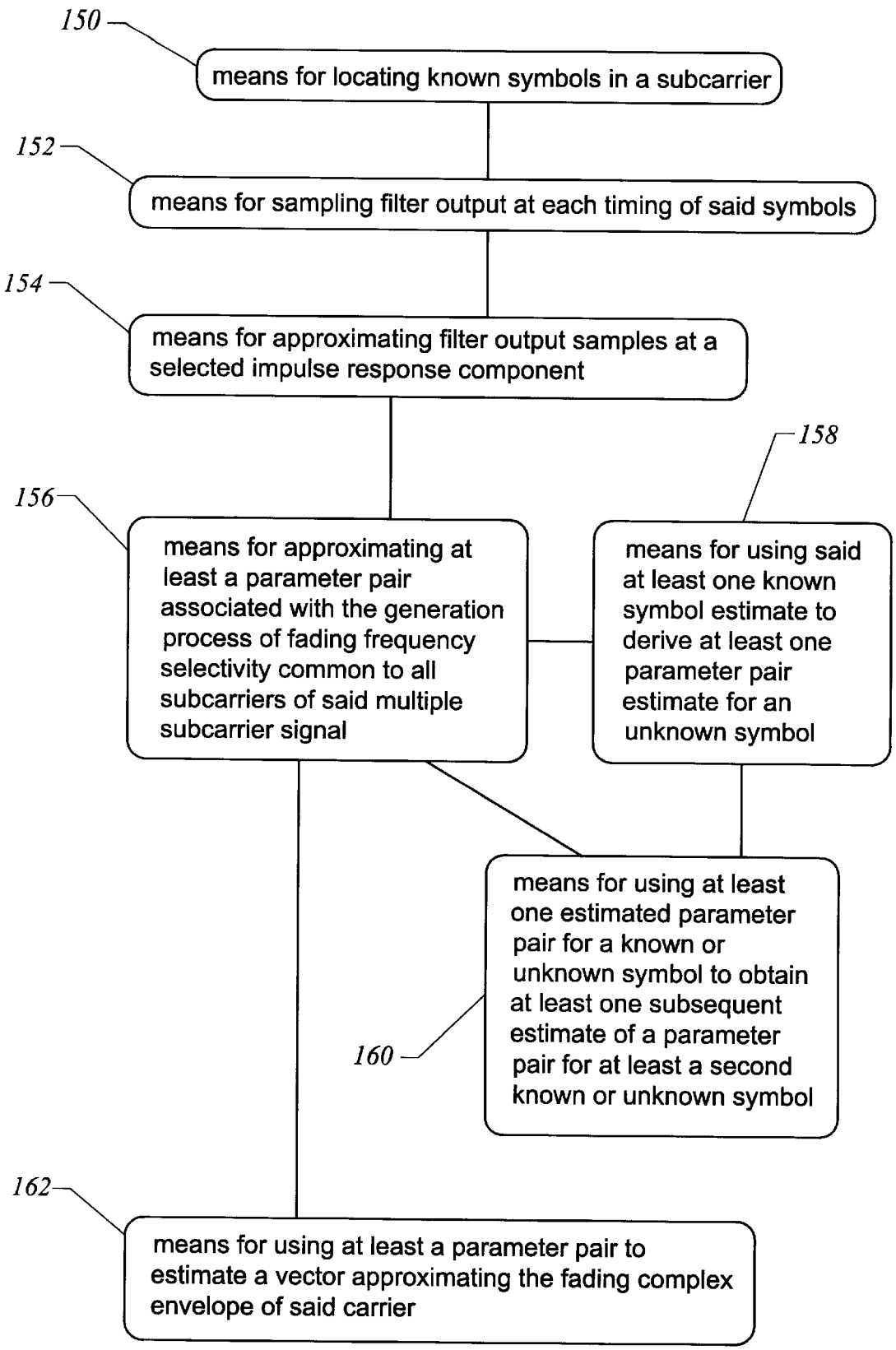
FIG. 20 is a block diagram of the apparatus of the invention.

FIG. 20 is a block diagram of an apparatus for joint detection and channel estimation according to the invention. Means for sampling filter output at each symbol timing 152 are coupled to means for locating known symbols in a subcarrier 150. The sampler 152 provides the filter output samples at $t=nT$. Thus, approximating means 154 transmit the filter output samples at the impulse response component $h_r(-\tau)$ at $t=nT$ to means 156 for approximating the parameter pair associated with the generation process of fading frequency selectivity common to all subcarriers of said multiple subcarrier signal.

Parameter pairs are estimated first for known symbols. Means 158 are provided for using the estimated parameter pair for known symbols. Previously-derived parameter pairs for known symbols may be used in the derivation of parameter pairs for subsequent unknown symbols. Means 160 for using the previously-derived parameter pairs for this subsequent estimation is thus provided. The estimated parameter pair, in turn, is communicated to the means 162 for estimating a vector corresponding to the fading complex envelope of the subcarrier.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

We claim:

1. A joint detection and channel estimation method for a signal having multiple subcarriers, comprising the steps of:

locating known symbols in a subcarrier of interest and at least one other of said multiple subcarriers;

estimating at least one parameter pair associated with a frequency-selective fading generation process common to each of said multiple subcarriers from said known symbols, wherein said estimated parameter pair is produced from symbols received via both said subcarrier of interest and said at least one other of said multiple subcarriers; and deriving a fading complex envelope for said subcarrier of interest from said estimated parameter pairs.

2. The joint detection and channel estimation method of claim 1, further comprising the step of using said at least one known symbol estimate to derive at least one parameter pair estimate for an unknown symbol.

3. The joint detection and channel estimation method of claim 2, wherein said unknown symbols include information symbols.

4. The joint detection and channel estimation method of claim 2, wherein said unknown symbol estimates are derived from estimates of time-indexed known symbols surrounding said unknown symbol.

5. The joint detection and channel estimation method of claim 2, wherein said unknown symbol estimates are derived by interpolation or curve-fitting.

6. The joint detection and channel estimation method of claim 2, wherein parameter pair estimates for unknown symbols are obtained through use of a decision-directed Kalman algorithm.

7. The joint detection and channel estimation method of claim 2, wherein said step of estimating said parameters for said unknown symbols further comprises the steps of:

providing a state space representation of the channel of said signal;

deriving a first estimate of the parameter pair for said unknown symbol from a previously determined parameter pair; and applying a recursive algorithm to said state space representation.

8. The joint detection and channel estimation method of claim 7, wherein said state space representation is determined by applying the equations:

$$x(n+1)=x(n)+g(n)+I_2 w(n),$$

$$z_r(n)=C(n)x(n)+I_M z_n(n),$$

where, $$z_r(n)=[z_{r1}(n) z_{r2}(n) \ldots z_{rM}(n)]^t,$$

and $$C(n) = \begin{bmatrix} s_1(n) & -j\omega_1 s_1(n) \\ s_2(n) & -j\omega_2 s_2(n) \\ M & M \\ s_M(n) & -j\omega_M s_M(n) \end{bmatrix},$$

wherein f(n): a function of the symbol timing index;

$x(n)=[x_1(n) x_2(n)]^t=f(n)$: values of the parameter pair $x(n+1)=x(n)+g(n)$ $g(n)=f(n+1)-f(n)$: the control force that forcibly drives the parameter vector.

9. The joint detection and channel estimation method of claim 7, wherein said recursive algorithm is:

$$\hat{x}(n)=\hat{x}(n-1)+g(n-1)+P(n-1)C(n)^H \cdot [C(n)P(n-1)C(n)^H+\lambda I_M]^{-1} \cdot [z_{rk}(n)-C(n)\{\hat{x}(n-1)+g(n-1)\}]$$

$$P(n) = \frac{\sigma_{nk}^2}{\lambda}\left[P(n-1) - P(n-1)C(n)^H[C(n)P(n-1)C(n)^H + \lambda I_M]^{-1}C(n)P(n-1)\right]$$

wherein $\hat{x}(n_1) = f(n_1)$;

$P(n_1) = I_2$.

10. The joint detection and channel estimation method of claim 7, wherein said first estimate is derived by estimating:

$$\hat{x}(n) = \hat{x}(n-1) + g(n-1)$$

where $\hat{x}(n)$ is the estimate of the parameter vector $x(n)$.

11. The joint detection and channel estimation method of claim 1, further comprising the step of using at least one estimated parameter pair for either of a known or unknown symbol to obtain at least one subsequent estimate of a parameter pair for at least a second symbol.

12. The joint detection and channel estimation method of claim 1, wherein said known symbols are located at different timings for at least two of said multiple subcarriers.

13. The joint detection and channel estimation method of claim 1, wherein said known symbols are selected from pilot symbols and unique words.

14. The joint detection and channel estimation method of claim 1, wherein said parameter pair estimates for known symbols are obtained through use of a recursive least square algorithm.

15. The joint detection and channel estimation method of claim 14, wherein said recursive least square algorithm is:

$$\hat{x}(i) = \hat{x}(i-1) + P(i-1)c(i)^H \cdot \frac{[z_{rk}(i) - c(i)\hat{x}(i-1)]}{c(i)P(i-1)c(i)^H + \lambda},$$

$$P(i) = \frac{\sigma_{nk}^2}{\lambda}\left[P(i-1) - \frac{P(i-1)c(i)^H c(i)P(i-1)}{c(i)P(i-1)c(i)^H + \lambda}\right];$$

wherein $P(i) = <[\hat{x}(i)-x(i)][\hat{x}(i)-x(i)]^H>,$ $$\lambda = \frac{\sigma_{nk}^2}{1+\sigma_w^2},$$

$\sigma_{nk}^2 = <|z_{nk}(i)|^2>,$ $\sigma_w^2 = <|w(i)|^2>.$

16. The joint detection and channel estimation method of claim 1, wherein said step of estimating said parameter pair for said known symbol further comprises the steps of:

providing a state space representation of the channel of said signal, where
 $x(i+1) = x(i) + I_2 w(i)$,
 $z_{rk}(i) = c(i)x(i) + z_{nk}(i)$; wherein
  i: Index for the Ordering of Signal Processing,
  $I_2$: 2×2 Unit Matrix,
  w(i): process noise,
  $c(i) = [s_k(i) - j\omega_k s_k(i)]$,
  $z_{nk}(i)$: AWGN; and applying a standard recursive least squared algorithm to said state space representation to provide a parameter estimate, where $$\hat{x}(i) = \hat{x}(i-1) + P(i-1)c(i)^H \cdot \frac{[z_{rk}(i) - c(i)\hat{x}(i-1)]}{c(i)P(i-1)c(i)^H + \lambda},$$

$$P(i) = \frac{\sigma_{nk}^2}{\lambda}\left[P(i-1) - \frac{P(i-1)c(i)^H c(i)P(i-1)}{c(i)P(i-1)c(i)^H + \lambda}\right];$$

wherein $P(i) = <[\hat{x}(i)-x(i)][\hat{x}(i)-x(i)]^H>,$ $$\lambda = \frac{\sigma_{nk}^2}{1+\sigma_w^2},$$

$\sigma_{nk}^2 = <|z_{nk}(i)|^2>,$ $\sigma_w^2 = <|w(i)|^2>.$

17. A joint detection and channel estimation method for multiple subcarrier signals, comprising the steps of:

locating known symbols in a subcarrier of interest and at least one other of said multiple subcarriers;

sampling a filter output at each timing nT of said known symbols;

approximating a parameter pair associated with a frequency-selective fading generation process common to each of said multiple subcarriers wherein said approximated parameter pair is produced from symbols received via both said subcarrier of interest and said at least one other of said multiple subcarriers; and estimating a vector approximating the fading complex envelope of said subcarrier of interest with said parameter pair;

wherein n is the signal timing index;

wherein T is the symbol duration.

18. The method of claim 17, wherein said filter output sampling further comprises the steps of:

providing a symbol sequence;

filtering said symbol sequence to provide an overall impulse response; and applying a channel transfer function to said overall impulse response to produce a received signal.

19. An apparatus for joint detection and channel estimation for multiple subcarrier signals, comprising:

means for locating known symbols in a subcarrier of interest and at least one other of said multiple subcarriers;

means for sampling filter output at each timing nT of said known symbols;

means for approximating a parameter pair associated with a frequency-selective fading generation process common to each of said multiple subcarriers, wherein said approximated parameter pair is produced from symbols received via both said subcarrier of interest and said at least one other of said multiple subcarriers; and means for estimating a vector approximating the fading complex envelope of said subcarrier of interest with said parameter pair;

wherein n is the signal timing index;

wherein T is the symbol duration.

20. The joint detection and channel estimation apparatus of claim 19, further comprising:

means for estimating at least one parameter pair associated with the generation process of the fading frequency selectivity common to each of said subcarriers from said known symbols.

21. The joint detection and channel estimation apparatus of claim 19, further comprising means for deriving at least one parameter pair estimate for an unknown symbol from said at least one known symbol estimate.

22. The joint detection and channel estimation apparatus of claim 19, further comprising means for obtaining at least one subsequent estimate of a parameter pair for at least a second symbol from at least one estimated parameter pair for either of a known or unknown symbol.

23. The joint detection and channel estimation apparatus of claim 19, wherein said means for sampling filter output is a Nyquist filter.

24. The joint detection and channel estimation apparatus of claim 19, wherein said means for approximating said parameter pair is a channel estimator.

25. The joint detection and channel estimation apparatus of claim 19, wherein said means for approximating said fading complex envelope of said subcarrier is a channel estimator.

* * * * *